(12) United States Patent
Gong et al.

(10) Patent No.: US 12,535,657 B2
(45) Date of Patent: Jan. 27, 2026

(54) OPTICAL IMAGING LENS ASSEMBLY

(71) Applicant: Zhejiang Sunny Optics Co., Ltd, Zhejiang (CN)

(72) Inventors: Tingting Gong, Zhejiang (CN); Litong Song, Zhejiang (CN); Fujian Dai, Zhejiang (CN); Liefeng Zhao, Zhejiang (CN)

(73) Assignee: ZHEJIANG SUNNY OPTICS CO., LTD., Yuyao (CN)

( * ) Notice: Subject to any disclaimer, the term of this patent is extended or adjusted under 35 U.S.C. 154(b) by 695 days.

(21) Appl. No.: 17/691,099

(22) Filed: Mar. 9, 2022

(65) Prior Publication Data
US 2022/0326487 A1 Oct. 13, 2022

(30) Foreign Application Priority Data
Apr. 13, 2021 (CN) .......................... 202110394628.4

(51) Int. Cl.
*G02B 13/00* (2006.01)
*G02B 9/12* (2006.01)

(52) U.S. Cl.
CPC ............ *G02B 13/0035* (2013.01); *G02B 9/12* (2013.01)

(58) Field of Classification Search
CPC ...... G02B 13/0035; G02B 9/12; G02B 13/04; G02B 13/18; G02B 13/00
USPC ........................................................ 359/716
See application file for complete search history.

(56) References Cited

U.S. PATENT DOCUMENTS

| | | | | |
|---|---|---|---|---|
| 10,222,583 | B2* | 3/2019 | Chen | G02B 5/208 |
| 2011/0228410 | A1* | 9/2011 | Hsu | G02B 13/0035 359/716 |
| 2013/0120859 | A1* | 5/2013 | Tsai | G02B 13/0035 359/716 |
| 2014/0327976 | A1* | 11/2014 | Chen | G02B 13/0035 359/716 |

(Continued)

FOREIGN PATENT DOCUMENTS

| | | |
|---|---|---|
| CN | 109975953 A | 7/2019 |
| CN | 111399192 A | 7/2020 |

(Continued)

OTHER PUBLICATIONS

English Translation of IDS of CN112014942-NPL (Year: 2020).*
Chinese Office Action corresponding to Chinese Application No. 202110394628.4, dated May 16, 2022, 8 pages.

*Primary Examiner* — Marin Pichler
*Assistant Examiner* — Kuei-Jen L Edenfield
(74) *Attorney, Agent, or Firm* — Reising Ethington P.C.

(57) ABSTRACT

The present disclosure provides an optical imaging lens assembly, comprising, sequentially along an optical axis from an object side to an image side: a first lens, having a negative refractive power, an object-side surface of the first lens being a concave surface; a second lens, having a positive refractive power, an image-side surface of the second lens being a convex surface; and a third lens, having a refractive power, an image-side surface of the third lens being a concave surface. An effective focal length f1 of the first lens and an effective focal length f of the optical imaging lens assembly satisfy: $-4<f1/f<-2$. A maximal field-of-view FOV of the optical imaging lens assembly and the effective focal length f of the optical imaging lens assembly satisfy: $1\ \text{mm}<\tan(\text{FOV}/2)\times f<2\ \text{mm}$.

13 Claims, 7 Drawing Sheets

(56) References Cited

U.S. PATENT DOCUMENTS

| | | | |
|---|---|---|---|
| 2015/0085383 A1* | 3/2015 | Choi | G02B 13/0035 |
| | | | 359/716 |
| 2017/0224201 A1* | 8/2017 | Yamamoto | G02B 27/005 |
| 2017/0254980 A1* | 9/2017 | Chen | G02B 13/0045 |
| 2019/0154978 A1 | 5/2019 | Chen et al. | |
| 2020/0142162 A1* | 5/2020 | Huang | G02B 9/12 |
| 2024/0160004 A1* | 5/2024 | Bang | A61B 1/043 |

FOREIGN PATENT DOCUMENTS

| | | |
|---|---|---|
| CN | 111624744 A | 9/2020 |
| CN | 112014942 A | 12/2020 |
| JP | 1078543 A | 3/1998 |

\* cited by examiner

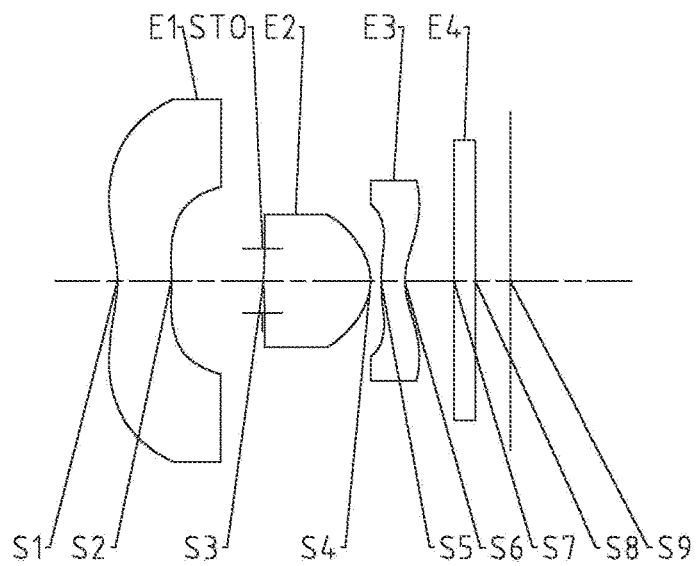
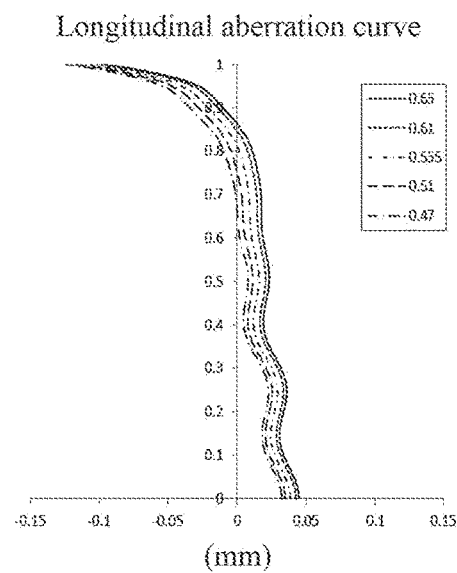
Fig. 3
Fig. 4A
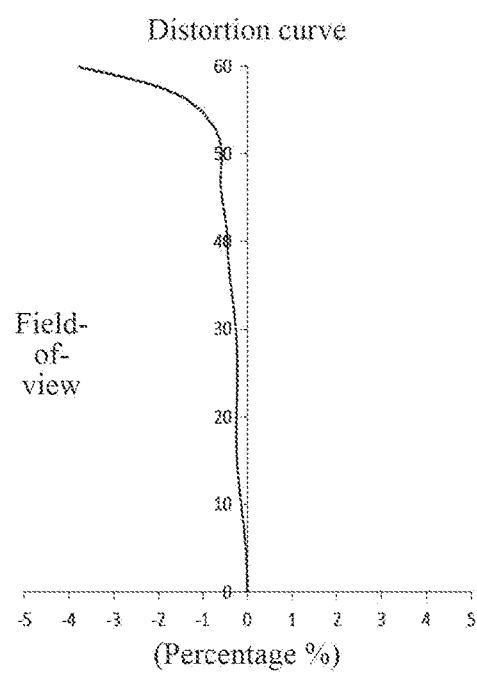
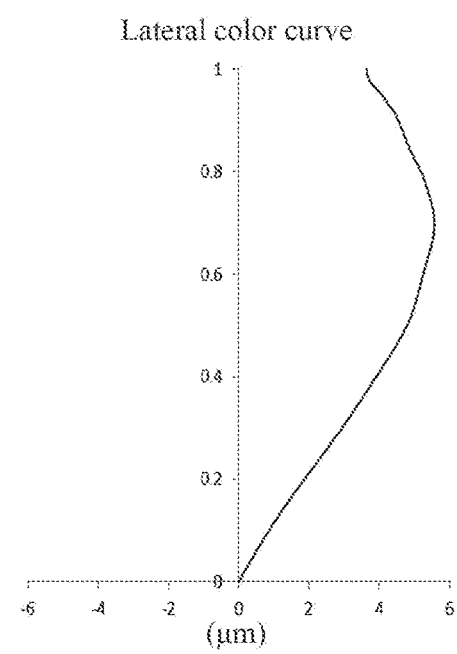
Fig. 4B
Fig. 4C

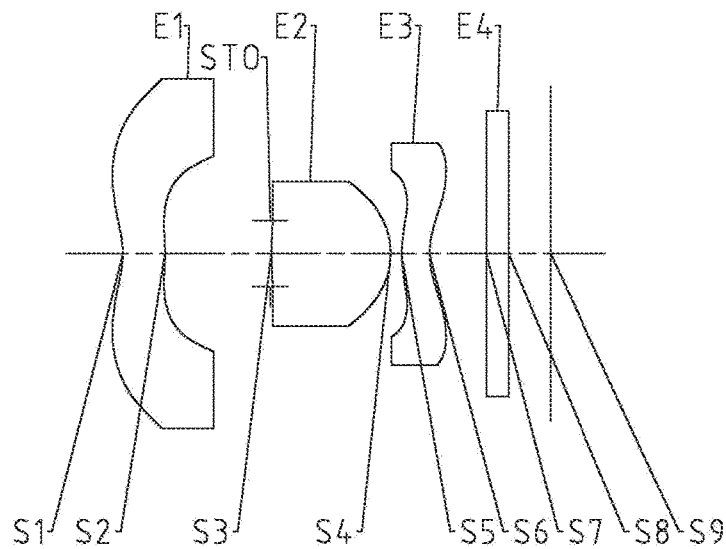
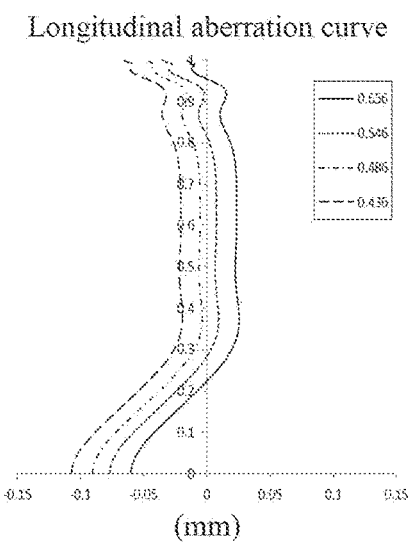
Fig. 13
Fig. 14A
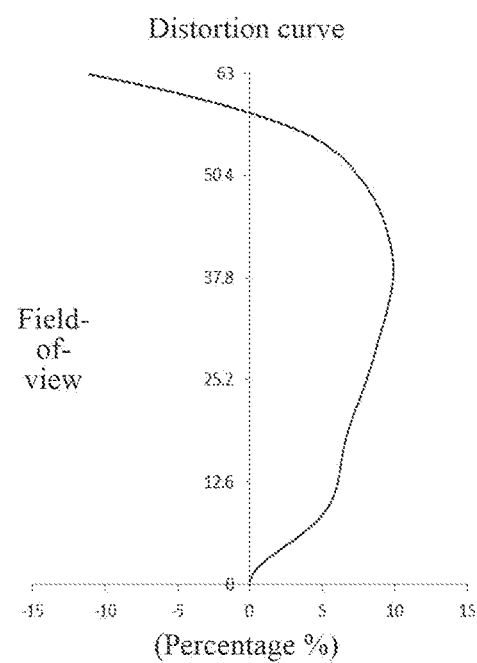
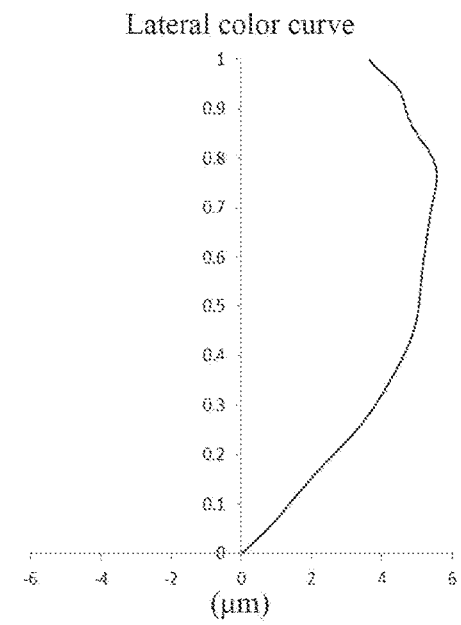
Fig. 14B
Fig. 14C

OPTICAL IMAGING LENS ASSEMBLY

CROSS-REFERENCE TO RELATED APPLICATIONS

This application claims benefit of priority to Chinese Patent Application No. 202110394628.4 filed on Apr. 13, 2021 before the China National Intellectual Property Administration, the entire disclosure of which is incorporated herein by reference in its entity.

TECHNICAL FIELD

The present disclosure relates to the field of optical elements, and specifically to an optical imaging lens assembly.

BACKGROUND

With the development of science and technology, smart portable electronic devices play an increasingly important role in our daily life, and the demands for miniaturization, lightweight and low cost of the devices are also constantly prominent during the update and iteration of products. Imaging lens assemblies, as an important part of smart electronic devices, also faces many challenges. That is, the imaging lens assemblies need to further have the characteristics such as miniaturization and high brightness, in addition to meeting the requirement for a high imaging quality.

Therefore, for the above problems, it is desirable to provide an optical imaging lens assembly that can be applied to a variety of smart portable electronic devices, especially in obstacle avoidance systems. The optical imaging lens assembly is able to further reduce the size, improve the brightness and reduce the distortion, under the premise of ensuring that the system has a high resolution.

SUMMARY

In an aspect of the present disclosure, an optical imaging lens assembly is provided, and the optical imaging lens assembly includes, sequentially along an optical axis from an object side to an image side: a first lens having a negative refractive power, an object-side surface of the first lens being a concave surface; a second lens having a positive refractive power, an image-side surface of the second lens being a convex surface; and a third lens having a refractive power, an image-side surface of the third lens being a concave surface. An effective focal length f1 of the first lens and an effective focal length f of the optical imaging lens assembly may satisfy: $-4<f1/f<-2$. A maximal field-of-view FOV of the optical imaging lens assembly and the effective focal length f of the optical imaging lens assembly may satisfy: $1\,\text{mm}<\tan(\text{FOV}/2)\times f<2\,\text{mm}$.

In an implementation, a half of a diagonal length ImgH of an effective pixel area on an image plane of the optical imaging lens assembly, the effective focal length f of the optical imaging lens assembly and an entrance pupil diameter EPD of the optical imaging lens assembly may satisfy: $3\,\text{mm}<\text{ImgH}\times f/\text{EPD}<4\,\text{mm}$.

In an implementation, a distance TTL from the object-side surface of the first lens to an image plane of the optical imaging lens assembly along the optical axis and a half of a diagonal length ImgH of the effective pixel area on the image plane of the optical imaging lens assembly may satisfy: $2<\text{TTL}/\text{ImgH}\leq 3$.

In an implementation, a radius of curvature R1 of the object-side surface of the first lens and the effective focal length f of the optical imaging lens assembly may satisfy: $-1.5<R1/f<-0.5$.

In an implementation, a radius of curvature R4 of the image-side surface of the second lens and a radius of curvature R6 of the image-side surface of the third lens may satisfy: $-2<R4/R6<-0.5$.

In an implementation, a center thickness CT1 of the first lens on the optical axis, a center thickness CT3 of the third lens on the optical axis and a center thickness CT2 of the second lens on the optical axis may satisfy: $0<(CT1+CT3)/CT2<1$.

In an implementation, a spaced interval T23 between the second lens and the third lens on the optical axis and a spaced interval T12 between the first lens and the second lens on the optical axis may satisfy: $0<10\times T23/T12<2$.

In an implementation, the center thickness CT1 of the first lens on the optical axis and a maximal effective radius DT11 of the object-side surface of the first lens may satisfy: $0<CT1/DT11<0.5$.

In an implementation, a maximal effective radius DT22 of the image-side surface of the second lens and a maximal effective radius DT31 of an object-side surface of the third lens may satisfy: $0.5<DT22/DT31<1$.

In an implementation, a maximal effective radius DT12 of an image-side surface of the first lens and a maximal effective radius DT21 of an object-side surface of the second lens may satisfy: $2<DT12/DT21<3$.

In an implementation, an axial distance SAG22 from an intersection point of the image-side surface of the second lens and the optical axis to a vertex of an effective radius of the image-side surface of the second lens, and the center thickness CT2 of the second lens on the optical axis may satisfy: $-0.5<SAG22/CT2<0$.

In an implementation, at least one of the object-side surface and the image-side surface of the third lens may have at least one inflection point.

In an implementation, the center thickness CT3 of the third lens on the optical axis and an axial distance YT32 from an intersection point of the image-side surface of the third lens and the optical axis to a point on the image-side surface of the third lens, the point being closest to the image plane of the optical imaging lens assembly, may satisfy: $1<CT3/YT32<2.5$.

In an implementation, the center thickness CT1 of the first lens on the optical axis and an edge thickness ET1 of the first lens at a maximal effective radius may satisfy: $0.4<CT1/ET1<1.3$.

In an implementation, the center thickness CT3 of the third lens on the optical axis and an edge thickness ET3 of the third lens at a maximal effective radius may satisfy: $0.5<CT3/ET3<1$.

In another aspect of the present disclosure, an optical imaging lens assembly is provided, and the optical imaging lens assembly includes, sequentially along an optical axis from an object side to an image side: a first lens having a negative refractive power, an object-side surface of the first lens being a concave surface; a second lens having a positive refractive power, an image-side surface of the second lens being a convex surface; and a third lens having a refractive power, an image-side surface of the third lens being a concave surface. An effective focal length f2 of the second lens and an effective focal length f of the optical imaging lens assembly may satisfy: $0.9<f2/f<1.5$. A maximal field-of-view FOV of the optical imaging lens assembly and the effective focal length f of the optical imaging lens assembly may satisfy: 1 mm<tan(FOV/2)×f<2 mm.

In an implementation, a half of a diagonal length ImgH of an effective pixel area on an image plane of the optical imaging lens assembly, the effective focal length f of the optical imaging lens assembly and an entrance pupil diameter EPD of the optical imaging lens assembly may satisfy: 3 mm<ImgH×f/EPD<4 mm.

In an implementation, a distance TTL from the object-side surface of the first lens to an image plane of the optical imaging lens assembly along the optical axis and a half of a diagonal length ImgH of the effective pixel area on the image plane of the optical imaging lens assembly may satisfy: 2<TTL/ImgH≤3.

In an implementation, a radius of curvature R1 of the object-side surface of the first lens and the effective focal length f of the optical imaging lens assembly may satisfy: −1.5<R1/f<−0.5.

In an implementation, a radius of curvature R4 of the image-side surface of the second lens and a radius of curvature R6 of the image-side surface of the third lens may satisfy: −2<R4/R6<−0.5.

In an implementation, a center thickness CT1 of the first lens on the optical axis, a center thickness CT3 of the third lens on the optical axis and a center thickness CT2 of the second lens on the optical axis may satisfy: 0(CT1+CT3)/CT2<1.

In an implementation, a spaced interval T23 between the second lens and the third lens on the optical axis and a spaced interval T12 between the first lens and the second lens on the optical axis may satisfy: 0<10×T23/T12<2.

In an implementation, the center thickness CT1 of the first lens on the optical axis and a maximal effective radius DT11 of the object-side surface of the first lens may satisfy: 0<CT1/DT11<0.5.

In an implementation, a maximal effective radius DT22 of the image-side surface of the second lens and a maximal effective radius DT31 of an object-side surface of the third lens may satisfy: 0.5<DT22/DT31<1.

In an implementation, a maximal effective radius DT12 of an image-side surface of the first lens and a maximal effective radius DT21 of an object-side surface of the second lens may satisfy: 2<DT12/DT21<3.

In an implementation, an axial distance SAG22 from an intersection point of the image-side surface of the second lens and the optical axis to a vertex of an effective radius of the image-side surface of the second lens, and the center thickness CT2 of the second lens on the optical axis may satisfy: −0.5<SAG22/CT2<0.

In an implementation, at least one of the object-side surface and the image-side surface of the third lens may have at least one inflection point.

In an implementation, the center thickness CT3 of the third lens on the optical axis and an axial distance YT32 from an intersection point of the image-side surface of the third lens and the optical axis to a point on the image-side surface of the third lens, the point being closest to the image plane of the optical imaging lens assembly, may satisfy: 1<CT3/YT32<2.5.

In an implementation, the center thickness CT1 of the first lens on the optical axis and an edge thickness ET1 of the first lens at a maximal effective radius may satisfy: 0.4<CT1/ET1<1.3.

In an implementation, the center thickness CT3 of the third lens on the optical axis and an edge thickness ET3 of the third lens at a maximal effective radius may satisfy: 0.5<CT3/ET3<1.

The present disclosure adopts a three-piece lens structure. Through a reasonable distribution of refractive powers and an optimal selection for surface types and thicknesses, the optical imaging lens assembly can have at least one beneficial effect such as a high resolution, a small size, high brightness and a small distortion.

BRIEF DESCRIPTION OF THE DRAWINGS

In combination with the accompanying drawings, other features, objectives and advantages of the present disclosure will become more apparent through the following detailed description for non-limiting embodiments. In the accompanying drawings:

FIG. 3 is a schematic structural diagram of an optical imaging lens assembly according to Embodiment 2 of the present disclosure;

FIGS. 4A-4C respectively illustrate a longitudinal aberration curve, a distortion curve and a lateral color curve of the optical imaging lens assembly in Embodiment 2;

FIG. 13 is a schematic structural diagram of an optical imaging lens assembly according to Embodiment 7 of the present disclosure; and FIGS. 14A-14C respectively illustrate a longitudinal aberration curve, a distortion curve and a lateral color curve of the optical imaging lens assembly in Embodiment 7.

DETAILED DESCRIPTION OF EMBODIMENTS

Figure 1:
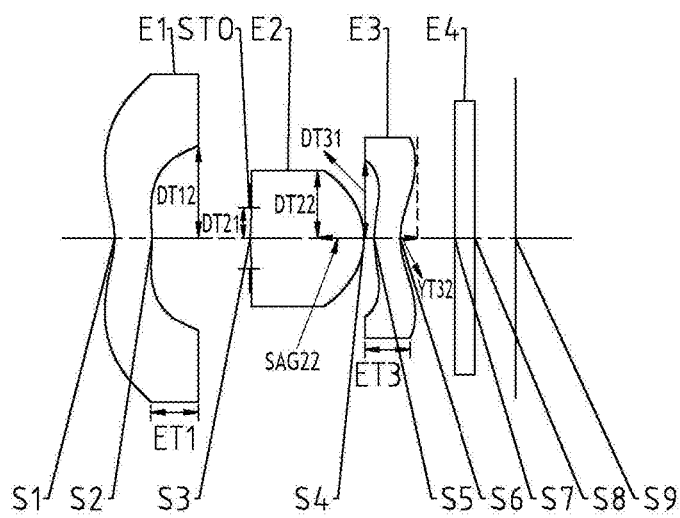
FIG. 1 is a schematic structural diagram of an optical imaging lens assembly according to Embodiment 1 of the present disclosure.

For a better understanding of the present disclosure, various aspects of the present disclosure will be described in more detail with reference to the accompanying drawings. It should be understood that the detailed description is merely an illustration for the exemplary implementations of the present disclosure, rather than a limitation to the scope of the present disclosure in any way. Throughout the specification, the same reference numerals designate the same elements.

The expression "and/or" includes any and all combinations of one or more of the associated listed items.

It should be noted that, in the specification, the expressions such as "first," "second" and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses are slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, a paraxial area refers to an area near an optical axis. If a lens surface is a convex surface and the position of the convex surface is not defined, it represents that the lens surface is a convex surface at least at the paraxial area. If the lens surface is a concave surface and the position of the concave surface is not defined, it represents that the lens surface is a concave surface at least in the paraxial area. Herein, in each lens, a surface closest to a photographed object is referred to as the object-side surface of the lens, and a surface closest to an image plane is referred to as the image-side surface of the lens.

It should be further understood that the terms "comprise," "comprising," "having," "include" and/or "including," when used in the specification, specify the presence of stated features, elements and/or components, but do not exclude the presence or addition of one or more other features, elements, components and/or combinations thereof. In addition, expressions such as "at least one of," when preceding a list of listed features, modify the entire list of features rather than an individual element in the list. Further, the use of "may," when describing the implementations of the present disclosure, relates to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (e.g., those defined in commonly used dictionaries) should be interpreted as having a meaning that is consistent with their meaning in the context of the relevant art and will not be interpreted in an idealized or overly formal sense unless expressly so defined herein.

It should be noted that the embodiments in the present disclosure and the features in the embodiments may be combined with each other on a non-conflict basis. The present disclosure will be described below in detail with reference to the accompanying drawings and in combination with the embodiments.

Features, principles and other aspects of the present disclosure are described below in detail.

An optical imaging lens assembly according to exemplary implementations of the present disclosure may include, for example, three lenses having refractive powers (i.e., a first lens, a second lens and a third lens). The three lenses are arranged in sequence along an optical axis from an object side to an image side.

In the exemplary implementations, the first lens may have a negative refractive power, the second lens may have a positive refractive power, and the third lens may have a positive refractive power or a negative refractive power. By reasonably controlling the refractive powers of the three lenses, various aberrations of the optical system can be effectively balanced, and the imaging quality of the lens assembly can be improved.

In the exemplary implementations, an object-side surface of the first lens may be a concave surface, an image-side surface of the second lens may be a convex surface, and an image-side surface of the third lens may be a concave surface. By reasonably controlling the surface types of the lenses, it is possible to contract the size as much as possible and reduce the tolerance sensitivity under the premise of ensuring the imaging quality.

In the exemplary implementations, the optical imaging lens assembly of the present disclosure may satisfy a conditional expression: $-4<f1/f<-2$. Here, f1 is an effective focal length of the first lens, and f is an effective focal length of the optical imaging lens assembly. The ratio of the effective focal length of the first lens to the effective focal length of the optical imaging lens assembly is controlled within this range, which can be conducive to controlling the contribution of the first lens to the refractive power of the entire optical system, thereby correcting the spherical aberration of the optical system. More specifically, f1 and f may satisfy: $-3.5<f1/f<-2.5$.

In the exemplary implementations, the optical imaging lens assembly of the present disclosure may satisfy a conditional expression: $0.9<f2/f<1.5$. Here, f2 is an effective focal length of the second lens, and f is the effective focal length of the optical imaging lens assembly. The ratio of the effective focal length of the second lens to the effective focal length of the optical imaging lens assembly is controlled within this range, which can be conducive to reasonably distributing the effective focal length of the optical imaging system and can play a role of correcting the off-axis aberration of the optical system.

In the exemplary implementations, the optical imaging lens assembly of the present disclosure may satisfy a conditional expression: $1 \text{ mm}<\tan(FOV/2)\times f<2 \text{ mm}$. Here, FOV is a maximal field-of-view of the optical imaging lens assembly, and f is the effective focal length of the optical imaging lens assembly. By controlling the maximal field-of-view of the optical imaging lens assembly and the effective focal length of the optical imaging lens assembly to satisfy $1 \text{ mm}<\tan(FOV/2)\times f<2 \text{ mm}$, the demand for a large field-of-view of the optical system can be met, and the small distortion characteristic of the optical system can be ensured. More specifically, FOV and f may satisfy: $1.4 \text{ mm}<\tan(FOV/2)\times f<2 \text{ mm}$.

In the exemplary implementations, the optical imaging lens assembly of the present disclosure may satisfy a conditional expression: $3 \text{ mm}<ImgH\times f/EPD<4 \text{ mm}$. Here, ImgH is a half of a diagonal length of an effective pixel area on an image plane of the optical imaging lens assembly, f is the effective focal length of the optical imaging lens assembly, and EPD is an entrance pupil diameter of the optical imaging lens assembly. By controlling the half of the diagonal length of the effective pixel area on the image plane of the optical imaging lens assembly, the effective focal length of the optical imaging lens assembly and the entrance pupil diameter of the optical imaging lens assembly to satisfy $3 \text{ mm}<ImgH\times f/EPD<4 \text{ mm}$, it can be ensured that the optical system has a large image plane characteristic, thus effectively correcting various low-order aberrations of the optical system. In addition, the controlling can help the optical system have a larger aperture to ensure a sufficient amount of light admitted to the lens assembly, thus improving the imaging quality. More specifically, ImgH, f and EPD may satisfy: 3.3 mm<ImgH×f/EPD<3.7 mm.

In the exemplary implementations, the optical imaging lens assembly of the present disclosure may satisfy a conditional expression: 2<TTL/ImgH≤3. Here, TTL is a distance from the object-side surface of the first lens to the image plane of the optical imaging lens assembly along the optical axis, and ImgH is the half of the diagonal length of the effective pixel area on the image plane of the optical imaging lens assembly. By controlling the ratio of the distance from the object-side surface of the first lens to the image plane of the optical imaging lens assembly along the optical axis to the half of the diagonal length of the effective pixel area on the image plane of the optical imaging lens assembly within the range, the miniaturization characteristic of the optical imaging lens assembly can be further realized on the basis that the large image plane of the optical system is satisfied. More specifically, TTL and ImgH may satisfy: 2.4<TTL/ImgH≤3.

In the exemplary implementations, the optical imaging lens assembly of the present disclosure may satisfy a conditional expression: −1.5<R1/f<−0.5. Here, R1 is a radius of curvature of the object-side surface of the first lens, and f is the effective focal length of the optical imaging lens assembly. By controlling the ratio of the radius of curvature of the object-side surface of the first lens to the effective focal length of the optical imaging lens assembly within this range, the axial chromatic aberration of the optical system can be effectively balanced, and at the same time, the demand for a small aperture can be met. Moreover, the controlling is conducive to the later processing and molding. More specifically, R1 and f may satisfy: −1.3<R1/f<−0.8.

In the exemplary implementations, the optical imaging lens assembly of the present disclosure may satisfy a conditional expression: −2<R4/R6<−0.5. Here, R4 is a radius of curvature of the image-side surface of the second lens, and R6 is a radius of curvature of the image-side surface of the third lens. By controlling the ratio of the radius of curvature of the image-side surface of the second lens to the radius of curvature of the image-side surface of the third lens within this range, the distortion and coma aberration of the optical system can be effectively corrected. Moreover, the controlling is conducive to reducing the tolerance sensitivity of the two lenses, thus ensuring the feasibility of mass production of the lens assembly. More specifically, R4 and R6 may satisfy: −1.6<R4/R6<−0.7.

In the exemplary implementations, the optical imaging lens assembly of the present disclosure may satisfy a conditional expression: 0<(CT1+CT3)/CT2<1. Here, CT1 is a center thickness of the first lens on the optical axis, CT3 is a center thickness of the third lens on the optical axis, and CT2 is a center thickness of the second lens on the optical axis. By controlling the ratio of the sum of the center thickness of the first lens on the optical axis and the center thickness of the third lens on the optical axis to the center thickness of the second lens on the optical axis within this range, the distortion and chromatic aberration of the optical system can be effectively corrected, thus reducing the ghost image generated by the optical system, and the compactness and assemblability of the optical system can be ensured. More specifically, CT1, CT3 and CT2 may satisfy: 0.5<(CT1+CT3)/CT2<0.8.

In the exemplary implementations, the optical imaging lens assembly of the present disclosure may satisfy a conditional expression: 0<10×T23/T12<2. Here, T23 is a spaced interval between the second lens and the third lens on the optical axis, and T12 is a spaced interval between the first lens and the second lens on the optical axis. The spaced interval between the second lens and the third lens on the optical axis and the spaced interval between the first lens and the second lens on the optical axis are controlled to satisfy 0<10×T23/T12<2, which can be conducive to ensuring the miniaturization of the optical imaging system. In addition, the intensity of the ghost image can be effectively weakened, thus making the system have a higher imaging quality. More specifically, T23 and T12 may satisfy: 0.5<10×T23/T12<1.2.

In the exemplary implementations, the optical imaging lens assembly of the present disclosure may satisfy a conditional expression: 0<CT1/DT11<0.5. Here, CT1 is the center thickness of the first lens on the optical axis, and DT11 is a maximal effective radius of the object-side surface of the first lens. By controlling the ratio of the center thickness of the first lens on the optical axis to the maximal effective radius of the object-side surface of the first lens within this range, the spherical aberration and off-axis aberrations of the optical system can be effectively controlled. Moreover, the controlling is conducive to reducing the tolerance sensitivity of the first lens, thus improving the yield. More specifically, CT1 and DT11 may satisfy: 0.1<CT1/DT11<0.4.

In the exemplary implementations, the optical imaging lens assembly of the present disclosure may satisfy a conditional expression: 0.5<DT22/DT31<1. Here, DT22 is a maximal effective radius of the image-side surface of the second lens, and DT31 is a maximal effective radius of an object-side surface of the third lens. The ratio of the maximal effective radius of the image-side surface of the second lens to the maximal effective radius of the object-side surface of the third lens is controlled within this range, which can be conducive to controlling the height difference of light between the two lenses, thus weakening the ghost image generated by the two lenses. In addition, the controlling is conducive to the assembly of the lenses, thus improving the reliability of the system. More specifically, DT22 and DT31 may satisfy: 0.8<DT22/DT31<1.

In the exemplary implementations, the optical imaging lens assembly of the present disclosure may satisfy a conditional expression: 2<DT12/DT21<3. Here, DT12 is a maximal effective radius of an image-side surface of the first lens, and DT21 is a maximal effective radius of an object-side surface of the second lens. The ratio of the maximal effective radius of the image-side surface of the first lens to the maximal effective radius of the object-side surface of the second lens is controlled within this range, which can be conducive to meeting the characteristics of the large field-of-view of the optical system, and correcting the distortion and spherical aberration of the optical system at the same time. More specifically, DT12 and DT21 may satisfy: 2.4<DT12/DT21<3.

In the exemplary implementations, the optical imaging lens assembly of the present disclosure may satisfy a conditional expression: −0.5<SAG22/CT2<0. Here, SAG22 is an axial distance from an intersection point of the image-side surface of the second lens and the optical axis to a vertex of an effective radius of the image-side surface of the second lens, and CT2 is the center thickness of the second lens on the optical axis. By controlling the ratio of the axial distance from the intersection point of the image-side surface of the second lens and the optical axis to the vertex of the effective radius of the image-side surface of the second lens to the center thickness of the second lens on the optical axis within this range, the field curvature and lateral chromatic aberration of the optical system can be corrected, thus improving the assemblability of the optical imaging lens assembly. More specifically, SAG22 and CT2 may satisfy: −0.5<SAG22/CT2<−0.2.

In the exemplary implementations, t at least one of the object-side surface and the image-side surface of the third lens has at least one inflection point. At least one inflection point is set on at least one of the object-side surface and the image-side surface of the third lens, which can be conducive to the uniform distribution of light on the third lens, thus ensuring the edge brightness and center brightness of the image plane. In addition, the setting is conducive to the further compression of the total track length of the optical system.

In the exemplary implementations, the optical imaging lens assembly of the present disclosure may satisfy a conditional expression: 1<CT3/YT32<2.5. Here, CT3 is the center thickness of the third lens on the optical axis, and YT32 is an axial distance from an intersection point of the image-side surface of the third lens and the optical axis to a point on the image-side surface of the third lens, the point being closest to the image plane of the optical imaging lens assembly. The ratio of the center thickness of the third lens on the optical axis to the axial distance from the intersection point of the image-side surface of the third lens and the optical axis to the point on the image-side surface of the third lens, the point being closest to the image plane of the optical imaging lens assembly, is controlled within this range, which can be conducive to correcting the axial chromatic aberration and astigmatism of the optical system, and weakening the ghost image generated due to the internal reflection of the third lens, thus ensuring that the optical system has a high resolution. In addition, the processibility of the lens is improved. More specifically, CT3 and YT32 may satisfy: 1.5<CT3/YT32<2.3.

In the exemplary implementations, the optical imaging lens assembly of the present disclosure may satisfy a conditional expression: 0.4<CT1/ET1<1.3. Here, CT1 is the center thickness of the first lens on the optical axis, and ET1 is an edge thickness of the first lens at a maximal effective radius. The ratio of the center thickness of the first lens on the optical axis to the edge thickness of the first lens at the maximal effective radius is controlled within this range, which can be conducive to controlling the thickness distribution of the first lens, thus making the first lens easy to be processed and molded. In addition, the controlling can be conducive to correcting the spherical aberration of the optical system, thus improving the imaging quality. More specifically, CT1 and ET1 may satisfy: 0.4<CT1/ET1<1.2.

In the exemplary implementations, the optical imaging lens assembly of the present disclosure may satisfy a conditional expression: 0.5<CT3/ET3<1. Here, CT3 is the center thickness of the third lens on the optical axis, and ET3 is an edge thickness of the third lens at a maximal effective radius. By controlling the ratio of the center thickness of the third lens on the optical axis to the edge thickness of the third lens at the maximal effective radius within this range, the distortion of the optical imaging system can be effectively corrected. In addition, the processibility of the lens can be ensured, thus improving the production yield. More specifically, CT3 and ET3 may satisfy: 0.5<CT3/ET3<0.7.

In the exemplary implementations, the above optical imaging lens assembly may further include at least one diaphragm. The diaphragm may be disposed at an appropriate position as required. For example, the diaphragm is disposed between the first lens and the second lens. Alternatively, the above optical imaging lens assembly may further include an optical filter for correcting color deviations and/or a protective glass for protecting a photosensitive element on the image plane.

The optical imaging lens assembly according to the above implementations of the present disclosure may use a plurality of lenses, for example, the above three lenses. By reasonably distributing the refractive powers and the surface types of the lenses, the center thicknesses of the lenses, the axial spacings between the lenses, etc., it is possible to effectively ensure that the lens assembly has characteristics such as a high resolution, a small size, high brightness and a small distortion.

In the implementations of the present disclosure, at least one of the surfaces of the lenses is an aspheric surface. That is, at least one of the surfaces from the object-side surface of the first lens to the image-side surface of the third lens is an aspheric surface. The aspheric lens is characterized in that the curvature continuously changes from the center of the lens to the periphery of the lens. Different from a spherical lens having a constant curvature from the center of the lens to the periphery of the lens, the aspheric lens has a better radius-of-curvature characteristic, and has advantages of improving the distortion aberration and improving the astigmatic aberration. The use of the aspheric lens can eliminate as much as possible the aberrations that occur during the imaging, thereby improving the imaging quality. Alternatively, at least one of the object-side surface and the image-side surface of each of the first lens, the second lens and the third lens is an aspheric surface. Alternatively, the object-side surface and the image-side surface of each of the first lens, the second lens and the third lens are aspheric surfaces.

However, it should be understood by those skilled in the art that the various results and advantages described in the present specification may be obtained by changing the number of the lenses constituting the optical imaging lens assembly without departing from the technical solution claimed by the present disclosure. For example, although the optical imaging lens assembly having three lenses is described as an example in the implementations, the optical imaging lens assembly is not limited to including the three lenses. If desired, the optical imaging lens assembly may also include other numbers of lenses.

Specific embodiments of the optical imaging lens assembly that may be applicable to the above implementations are further described below with reference to the accompanying drawings.

EMBODIMENT 1

An optical imaging lens assembly according to Embodiment 1 of the present disclosure is described below with reference to FIGS. 1-2C. FIG. 1 is a schematic structural diagram of the optical imaging lens assembly according to Embodiment 1 of the present disclosure.

As shown in FIG. 1, the optical imaging lens assembly includes, sequentially along an optical axis from an object side to an image side, a first lens E1 a diaphragm STO, a second lens E2, a third lens E3 and an optical filter E4.

The first lens E1 has a negative refractive power, an object-side surface S1 of the first lens E1 is a concave surface, and an image-side surface S2 of the first lens E1 is a convex surface. The second lens E2 has a positive refractive power, an object-side surface S3 of the second lens E2 is a convex surface, and an image-side surface S4 of the second lens E2 is a convex surface. The third lens E3 has a negative refractive power, an object-side surface S5 of the third lens E3 is a convex surface, and an image-side surface S6 of the third lens E3 is a concave surface. The optical filter E4 has an object-side surface S7 and an image-side surface S8. The optical imaging lens assembly has an image plane S9, and light from an object sequentially passes through the surfaces S1-S8 and finally forms an image on the image plane S9.

Table 1 shows basic parameters of the optical imaging lens assembly in Embodiment 1. Here, the units of a radius of curvature and a thickness/distance are millimeters (mm).

TABLE 1

| surface number | surface type | radius of curvature | thickness/distance | material refractive index | abbe number | conic coefficient |
|---|---|---|---|---|---|---|
| OBJ | spherical | infinite | infinite | | | |
| S1 | aspheric | −0.7508 | 0.3732 | 1.55 | 56.1 | −7.3320 |
| S2 | aspheric | −1.7858 | 0.9796 | | | −16.5680 |
| STO | spherical | infinite | 0.0087 | | | |
| S3 | aspheric | 2.8458 | 1.1396 | 1.55 | 56.1 | 26.8214 |
| S4 | aspheric | −0.7360 | 0.0986 | | | −0.2748 |
| S5 | aspheric | 0.9063 | 0.2614 | 1.65 | 23.5 | −99.9000 |
| S6 | aspheric | 0.7272 | 0.5436 | | | −4.1931 |
| S7 | spherical | infinite | 0.2101 | 1.52 | 64.2 | |
| S8 | spherical | infinite | 0.4052 | | | |
| S9 | spherical | infinite | | | | |

In Embodiment 1, the object-side surface and the image-side surface of any lens in the first to third lenses E1-E3 are both aspheric surfaces, and the surface type x of an aspheric lens may be defined using, but not limited to, the following formula:

$$x = \frac{ch^2}{1 + \sqrt{1 - (k+1)c^2 h^2}} + \sum A_i h^i. \quad (1)$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient; and $A_i$ is the correction coefficient of an i-th order of the aspheric surface. Tables 2-1 and 2-2 below give the high-order coefficients $A_4, A_6, A_8, A_{10}, A_{12}, A_{14}, A_{16}, A_{18}, A_{20}, A_{22}$ and $A_{24}$ applicable to the aspheric surfaces S1-S6 in Embodiment 1.

TABLE 2-1

| surface number | A4 | A6 | A8 | A10 | A12 | A14 | A16 |
|---|---|---|---|---|---|---|---|
| S1 | 7.6920E−01 | −1.8945E+00 | 3.9283E+00 | −5.9926E+00 | 6.4806E+00 | −4.8975E+00 | 2.5552E+00 |
| S2 | 1.7403E+00 | −3.8007E+00 | 5.9081E+00 | −3.1802E+01 | 3.3828E+02 | −1.7515E+03 | 5.0222E+03 |
| S3 | 3.1326E+00 | −5.9937E+02 | 5.5178E+04 | −3.1163E+06 | 1.1371E+08 | −2.7558E+09 | 4.4705E+10 |
| S4 | −2.3769E+00 | 5.8255E+01 | −9.1030E+02 | 9.2441E+03 | −6.2542E+04 | 2.8715E+05 | −8.9716E+05 |
| S5 | 5.2416E+00 | −9.2392E+01 | 9.7605E+02 | −7.1725E+03 | 3.6597E+04 | −1.2953E+05 | 3.1594E+05 |
| S6 | 3.6435E−01 | −6.9948E+00 | 3.3651E+01 | −1.0702E+02 | 2.5598E+02 | −4.7131E+02 | 6.4948E+02 |

TABLE 2-2

| surface number | A18 | A20 | A22 | A24 |
|---|---|---|---|---|
| S1 | −8.9913E−01 | 2.0336E−01 | −2.6667E−02 | 1.5399E−03 |
| S2 | −8.5814E+03 | 8.7246E+03 | −4.8736E+03 | 1.1507E+03 |
| S3 | −4.7916E+11 | 3.2523E+12 | −1.2652E+13 | 2.1477E+13 |
| S4 | 1.8768E+06 | −2.5139E+06 | 1.9481E+06 | −6.6398E+05 |
| S5 | −5.2006E+05 | 5.5103E+05 | −3.3906E+05 | 9.2027E+04 |
| S6 | −6.3534E+02 | 4.1015E+02 | −1.5514E+02 | 2.5893E+01 |

Figure 2A:
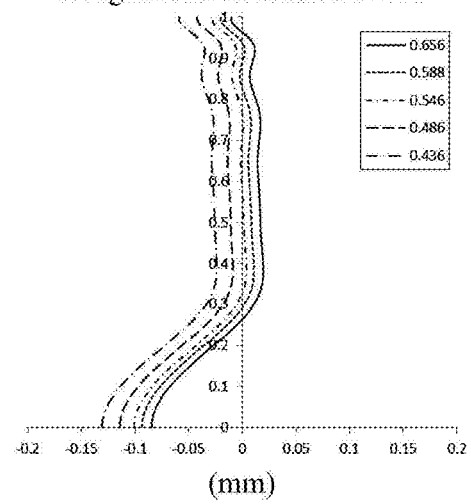
FIGS. 2A-2C respectively illustrate a longitudinal aberration curve, a distortion curve and a lateral color curve of the optical imaging lens assembly in Embodiment 1.
Figure 2B:
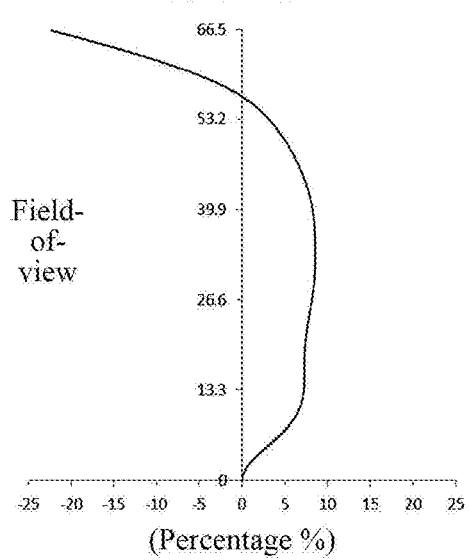
Figure 2C:
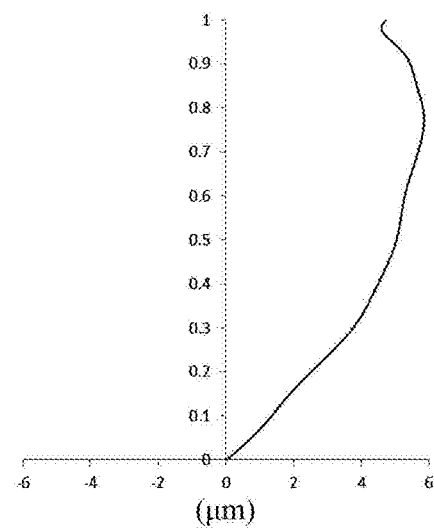

FIG. 2A illustrates a longitudinal aberration curve of the optical imaging lens assembly in Embodiment 1, representing deviations of focal points converged by light of different wavelengths which passes through the lens assembly. FIG. 2B illustrates a distortion curve of the optical imaging lens assembly in Embodiment 1, representing amounts of distortion corresponding to different fields-of-view. FIG. 2C illustrates a lateral color curve of the optical imaging lens assembly in Embodiment 1, representing deviations of different image heights on the image plane formed by light passing through the lens assembly. It can be seen from FIGS. 2A-2C that the optical imaging lens assembly given in Embodiment 1 can achieve a good imaging quality.

EMBODIMENT 2

An optical imaging lens assembly according to Embodiment 2 of the present disclosure is described below with reference to FIGS. 3-4C. In this embodiment and the following embodiments, for the sake of brevity, some descriptions similar to those in Embodiment 1 will be omitted. In this embodiment and the following embodiments, annotations for, such as ET1, ET3, DT22, DT31, DT12, DT21, SAG22, YT32, which are similar to that annotated in FIG. 1, are also omitted from the following figures for the sake of brevity. FIG. 3 is a schematic structural diagram of the optical imaging lens assembly according to Embodiment 2 of the present disclosure.

As shown in FIG. 3, the optical imaging lens assembly includes, sequentially along an optical axis from an object side to an image side, a first lens E1, a diaphragm STO, a second lens E2, a third lens E3 and an optical filter E4.

The first lens E1 has a negative refractive power, an object-side surface S1 of the first lens E1 is a concave surface, and an image-side surface S2 of the first lens E1 is a convex surface. The second lens E2 has a positive refractive power, an object-side surface S3 of the second lens E2 is a convex surface, and an image-side surface S4 of the second lens E2 is a convex surface. The third lens E3 has a negative refractive power, an object-side surface S5 of the third lens E3 is a convex surface, and an image-side surface S6 of the third lens E3 is a concave surface. The optical filter E4 has an object-side surface S7 and an image-side surface S8. The optical imaging lens assembly has an image plane S9, and light from an object sequentially passes through the surfaces S1-S8 and finally forms an image on the image plane S9.

Table 3 shows basic parameters of the optical imaging lens assembly in Embodiment 2. Here, the units of a radius of curvature and a thickness/distance are millimeters (mm). Tables 4 and 5 show the high-order coefficients $A_4$, $A_6$, $A_8$, $A_{10}$, $A_{12}$, $A_{14}$, $A_{16}$, $A_{18}$, $A_{20}$, $A_{22}$, $A_{24}$, $A_{26}$, $A_{28}$ and $A_{30}$ applicable to the aspheric surfaces S1-S6 in Embodiment 2. Here, the surface type of each aspheric surface may be defined using the formula (1) given in Embodiment 1.

TABLE 3

| surface number | surface type | radius of curvature | thickness/distance | material refractive index | abbe number | conic coefficient |
|---|---|---|---|---|---|---|
| OBJ | spherical | infinite | 450.0000 | | | |
| S1 | aspheric | −1.1899 | 0.5272 | 1.55 | 56.1 | −9.3514 |
| S2 | aspheric | −5.1775 | 0.8942 | | | 28.7371 |
| STO | spherical | infinite | 0.0091 | | | |
| S3 | aspheric | 2.9022 | 1.0572 | 1.55 | 56.1 | 35.4285 |
| S4 | aspheric | −0.5157 | 0.1000 | | | −0.4624 |
| S5 | aspheric | 1.4542 | 0.2334 | 1.68 | 19.2 | −54.2403 |
| S6 | aspheric | 0.6422 | 0.4815 | | | −2.9906 |
| S7 | spherical | infinite | 0.2100 | 1.52 | 64.2 | |
| S8 | spherical | infinite | 0.3434 | | | |
| S9 | spherical | infinite | | | | |

TABLE 4

| surface number | A4 | A6 | A8 | A10 | A12 | A14 | A16 |
|---|---|---|---|---|---|---|---|
| S1 | 3.7897E−01 | −3.4393E−01 | −3.4029E−01 | 2.0987E+00 | −4.2682E+00 | 5.3508E+00 | −4.6073E+00 |
| S2 | 1.0372E+00 | −1.6470E+00 | 2.2682E+01 | −2.6531E+02 | 1.5746E+03 | −4.6148E+03 | 1.7677E+03 |
| S3 | 3.0879E+00 | −1.2108E+03 | 1.7454E+05 | −1.4203E+07 | 7.3334E+08 | −2.5635E+10 | 6.2940E+11 |
| S4 | 6.3671E−01 | 2.0800E+01 | −6.1718E+02 | 9.1431E+03 | −7.5087E+04 | 2.6773E+05 | 9.6618E+05 |
| S5 | 1.4734E+00 | −1.9156E+01 | −1.2825E+02 | 5.7939E+03 | −7.8913E+04 | 6.4383E+05 | −3.5579E+06 |
| S6 | −5.6084E−01 | −1.0700E+01 | 1.5380E+02 | −1.1923E+03 | 6.2015E+03 | −2.3001E+04 | 6.2492E+04 |

TABLE 5

| surface number | A18 | A20 | A22 | A24 | A26 | A28 | A30 |
|---|---|---|---|---|---|---|---|
| S1 | 2.8254E+00 | −1.2464E+00 | 3.9266E−01 | −8.6142E−02 | 1.2487E−02 | −1.0733E−03 | 4.1319E−05 |
| S2 | 3.7674E+04 | −1.5373E+05 | 3.2058E+05 | −4.0812E+05 | 3.1981E+05 | −1.4225E+05 | 2.7550E+04 |
| S3 | −1.1062E+13 | 1.3986E+14 | −1.2614E+15 | 7.9125E+15 | −3.2767E+16 | 8.0445E+16 | −8.8562E+16 |
| S4 | −1.7206E+07 | 1.0159E+08 | −3.5331E+08 | 7.8376E+08 | −1.0943E+09 | 8.8003E+08 | −3.1160E+08 |
| S5 | 1.3913E+07 | −3.9046E+07 | 7.8270E+07 | −1.0945E+08 | 1.0145E+08 | −5.6003E+07 | 1.3936E+07 |
| S6 | −1.2568E+05 | 1.8674E+05 | −2.0214E+05 | 1.5472E+05 | −7.9228E+04 | 2.4316E+04 | −3.3774E+03 |

FIG. 4A illustrates a longitudinal aberration curve of the optical imaging lens assembly in Embodiment 2, representing deviations of focal points converged by light of different wavelengths which passes through the lens assembly. FIG. 4B illustrates a distortion curve of the optical imaging lens assembly in Embodiment 2, representing amounts of distortion corresponding to different fields-of-view. FIG. 4C illustrates a lateral color curve of the optical imaging lens assembly in Embodiment 2, representing deviations of different image heights on the image plane formed by light passing through the lens assembly. It can be seen from FIGS. 4A-4C that the optical imaging lens assembly given in Embodiment 2 can achieve a good imaging quality.

EMBODIMENT 3

Figure 5:
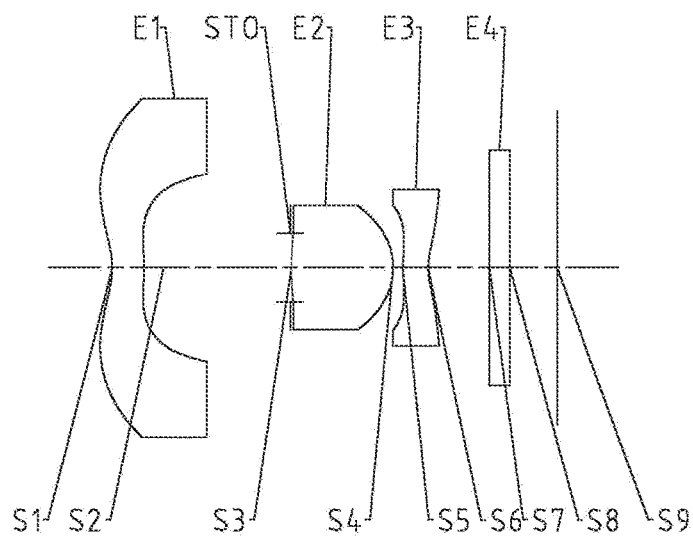
FIG. 5 is a schematic structural diagram of an optical imaging lens assembly according to Embodiment 3 of the present disclosure.

An optical imaging lens assembly according to Embodiment 3 of the present disclosure is described below with reference to FIGS. 5-6C. FIG. 5 is a schematic structural diagram of the optical imaging lens assembly according to Embodiment 3 of the present disclosure.

As shown in FIG. 5, the optical imaging lens assembly includes, sequentially along an optical axis from an object side to an image side, a first lens E1, a diaphragm STO, a second lens E2, a third lens E3 and an optical filter E4.

The first lens E1 has a negative refractive power, an object-side surface S1 of the first lens E1 is a concave surface, and an image-side surface S2 of the first lens E1 is a convex surface. The second lens E2 has a positive refractive power, an object-side surface S3 of the second lens E2 is a convex surface, and an image-side surface S4 of the second lens E2 is a convex surface. The third lens E3 has a negative refractive power, an object-side surface S5 of the third lens E3 is a convex surface, and an image-side surface S6 of the third lens E3 is a concave surface. The optical filter E4 has an object-side surface S7 and an image-side surface S8. The optical imaging lens assembly has an image plane S9, and light from an object sequentially passes through the surfaces S1-S8 and finally forms an image on the image plane S9.

Table 6 shows basic parameters of the optical imaging lens assembly in Embodiment 3. Here, the units of a radius of curvature and a thickness/distance are millimeters (mm). Tables 7 and 8 show the high-order coefficients $A_4$, $A_6$, $A_8$, $A_{10}$, $A_{12}$, $A_{14}$, $A_{16}$, $A_{18}$, $A_{20}$, $A_{22}$, $A_{24}$, $A_{26}$, $A_{28}$ and $A_{30}$ applicable to the aspheric surfaces S1-S6 in Embodiment 3. Here, the surface type of each aspheric surface may be defined using the formula (1) given in Embodiment 1.

TABLE 6

| surface number | surface type | radius of curvature | thickness/distance | material refractive index | abbe number | conic coefficient |
|---|---|---|---|---|---|---|
| OBJ | spherical | infinite | infinite | | | |
| S1 | aspheric | −0.7799 | 0.3272 | 1.55 | 56.1 | −6.3021 |
| S2 | aspheric | −2.4313 | 1.5041 | | | −27.3464 |
| STO | spherical | infinite | 0.0118 | | | |
| S3 | aspheric | 1.9125 | 1.0524 | 1.55 | 56.1 | 13.6392 |
| S4 | aspheric | −0.9189 | 0.1000 | | | 0.1239 |
| S5 | aspheric | 0.7715 | 0.2600 | 1.68 | 19.2 | −99.9000 |
| S6 | aspheric | 0.5920 | 0.6315 | | | −11.1708 |
| S7 | spherical | infinite | 0.2100 | 1.52 | 64.2 | |
| S8 | spherical | infinite | 0.4883 | | | |
| S9 | spherical | infinite | | | | |

TABLE 7

| surface number | A4 | A6 | A8 | A10 | A12 | A14 | A16 |
|---|---|---|---|---|---|---|---|
| S1 | 4.7811E−01 | −4.5314E−01 | −5.5775E−01 | 3.5454E+00 | −7.8542E+00 | 1.0695E+01 | −9.9352E+00 |
| S2 | −6.9704E−01 | 4.9363E+01 | −7.4401E+02 | 6.7672E+03 | −4.0903E+04 | 1.7193E+05 | −5.1569E+05 |
| S3 | 1.4770E+00 | −2.3227E+02 | 1.2513E+04 | −2.7345E+05 | −4.3482E+06 | 4.4488E+08 | −1.3405E+10 |
| S4 | −4.6141E+00 | 3.0470E+01 | 5.8149E+02 | −1.9508E+04 | 2.8553E+05 | −2.6489E+06 | 1.6992E+07 |
| S5 | 5.3879E+00 | −2.7896E+02 | 6.1566E+03 | −8.9045E+04 | 9.0616E+05 | −6.6806E+06 | 3.6247E+07 |
| S6 | 6.1618E−01 | −4.2139E+01 | 7.3819E+02 | −8.0007E+03 | 5.9166E+04 | −3.0909E+05 | 1.1624E+06 |

TABLE 8

| surface number | A18 | A20 | A22 | A24 | A26 | A28 | A30 |
|---|---|---|---|---|---|---|---|
| S1 | 6.5381E+00 | −3.0852E+00 | 1.0388E+00 | −2.4381E−01 | 3.7923E−02 | −3.5144E−03 | 1.4690E−04 |
| S2 | 1.1181E+06 | −1.7555E+06 | 1.9762E+06 | −1.5543E+06 | 8.1063E+05 | −2.5186E+05 | 3.5275E+04 |
| S3 | 2.3463E+11 | −2.6745E+12 | 2.0474E+13 | −1.0453E+14 | 3.4132E+14 | −6.4363E+14 | 5.3170E+14 |
| S4 | −7.7897E+07 | 2.5783E+08 | −6.1252E+08 | 1.0200E+09 | −1.1318E+09 | 7.5231E+08 | −2.2685E+08 |
| S5 | −1.4573E+08 | 4.3333E+08 | −9.4102E+08 | 1.4518E+09 | −1.5085E+09 | 9.4736E+08 | −2.7193E+08 |
| S6 | −3.1758E+06 | 6.3005E+06 | −8.9718E+06 | 8.9238E+06 | −5.8786E+06 | 2.3013E+06 | −4.0471E+05 |

Figure 6A:
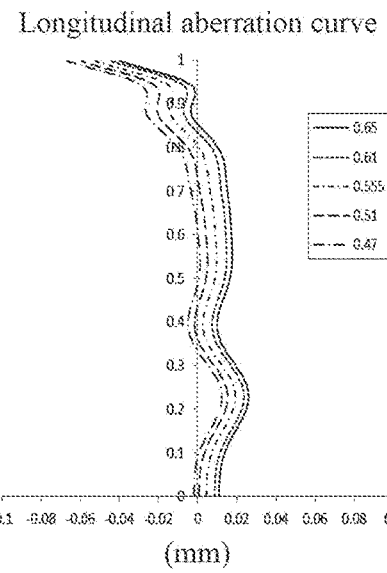
FIGS. 6A-6C respectively illustrate a longitudinal aberration curve, a distortion curve and a lateral color curve of the optical imaging lens assembly in Embodiment 3.
Figure 6B:
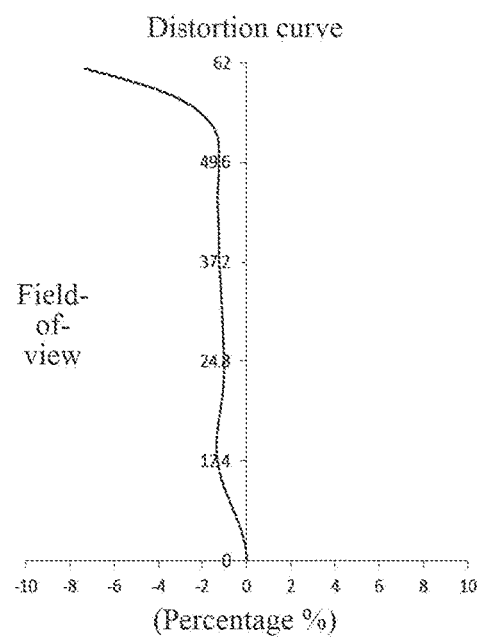
Figure 6C:
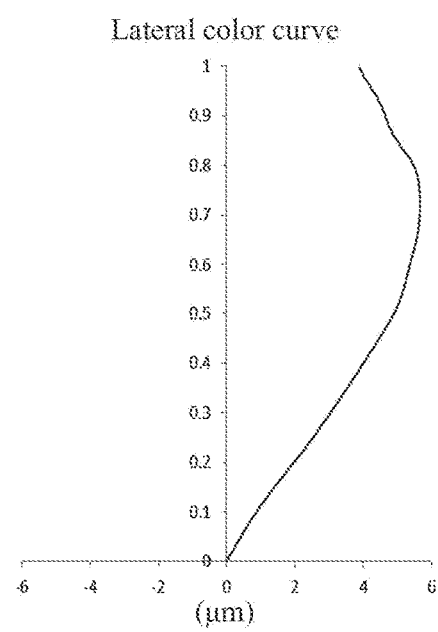

FIG. 6A illustrates a longitudinal aberration curve of the optical imaging lens assembly in Embodiment 3, representing deviations of focal points converged by light of different wavelengths which passes through the lens assembly. FIG. 6B illustrates a distortion curve of the optical imaging lens assembly in Embodiment 3, representing amounts of distortion corresponding to different fields-of-view. FIG. 6C illustrates a lateral color curve of the optical imaging lens assembly in Embodiment 3, representing deviations of different image heights on the image plane formed by light passing through the lens assembly. It can be seen from FIGS. 6A-6C that the optical imaging lens assembly given in Embodiment 3 can achieve a good imaging quality.

EMBODIMENT 4

Figure 7:
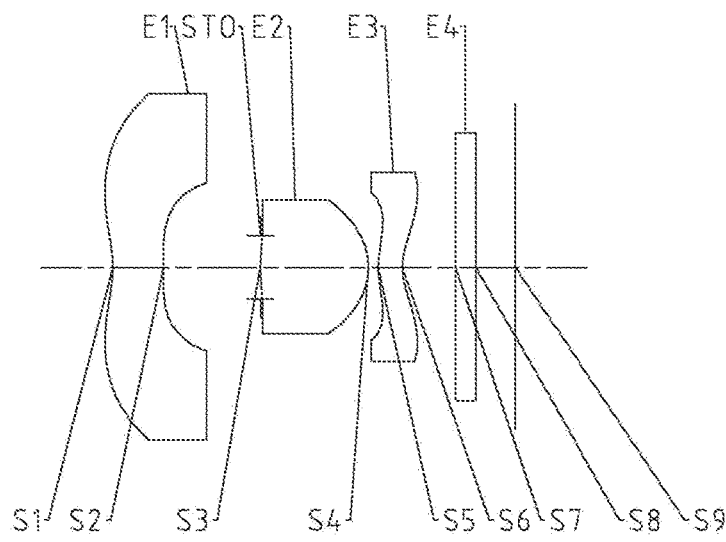
FIG. 7 is a schematic structural diagram of an optical imaging lens assembly according to Embodiment 4 of the present disclosure.

An optical imaging lens assembly according to Embodiment 4 of the present disclosure is described below with reference to FIGS. 7-8C. FIG. 7 is a schematic structural diagram of the optical imaging lens assembly according to Embodiment 4 of the present disclosure.

As shown in FIG. 7, the optical imaging lens assembly includes, sequentially along an optical axis from an object side to an image side, a first lens E1, a diaphragm STO, a second lens E2, a third lens E3 and an optical filter E4.

The first lens E1 has a negative refractive power, an object-side surface S1 of the first lens E1 is a concave surface, and an image-side surface S2 of the first lens E1 is a convex surface. The second lens E2 has a positive refractive power, an object-side surface S3 of the second lens E2 is a convex surface, and an image-side surface S4 of the second lens E2 is a convex surface. The third lens E3 has a negative refractive power, an object-side surface S5 of the third lens E3 is a convex surface, and an image-side surface S6 of the third lens E3 is a concave surface. The optical filter E4 has an object-side surface S7 and an image-side surface S8. The optical imaging lens assembly has an image plane S9, and light from an object sequentially passes through the surfaces S1-S8 and finally forms an image on the image plane S9.

Table 9 shows basic parameters of the optical imaging lens assembly in Embodiment 4. Here, the units of a radius of curvature and a thickness/distance are millimeters (mm). Tables 10 and 11 show the high-order coefficients $A_4$, $A_6$, $A_8$, $A_{10}$, $A_{12}$, $A_{14}$, $A_{16}$, $A_{18}$, $A_{20}$, $A_{22}$, $A_{24}$, $A_{26}$, $A_{28}$ and $A_{30}$ applicable to the aspheric surfaces S1-S6 in Embodiment 4. Here, the surface type of each aspheric surface may be defined using the formula (1) given in Embodiment 1.

TABLE 9

| surface number | surface type | radius of curvature | thickness/ distance | material refractive index | abbe number | conic coefficient |
|---|---|---|---|---|---|---|
| OBJ | spherical | infinite | 450.0000 | | | |
| S1 | aspheric | −1.1071 | 0.5223 | 1.55 | 56.1 | −11.2805 |
| S2 | aspheric | −8.1602 | 0.9954 | | | −99.9000 |
| STO | spherical | infinite | −0.0022 | | | |
| S3 | aspheric | 2.1856 | 1.1186 | 1.55 | 56.1 | 31.8160 |
| S4 | aspheric | −0.8259 | 0.1000 | | | 0.0144 |
| S5 | aspheric | 0.7539 | 0.2500 | 1.68 | 19.2 | −59.4832 |
| S6 | aspheric | 0.6068 | 0.5466 | | | −3.4494 |
| S7 | spherical | infinite | 0.2100 | 1.52 | 64.2 | |
| S8 | spherical | infinite | 0.4068 | | | |
| S9 | spherical | infinite | | | | |

TABLE 10

| surface number | A4 | A6 | A8 | A10 | A12 | A14 | A16 |
|---|---|---|---|---|---|---|---|
| S1 | 4.1504E−01 | −7.0326E−01 | 1.0350E+00 | −1.1706E+00 | 9.8649E−01 | −6.0740E−01 | 2.6775E−01 |
| S2 | 6.4711E−01 | 1.5723E+01 | −2.4883E+02 | 2.1256E+03 | −1.1684E+04 | 4.3515E+04 | −1.1193E+05 |
| S3 | −1.1329E+00 | 2.7439E+01 | −9.8399E+02 | 1.7850E+04 | −1.8333E+05 | 9.8495E+05 | −2.1879E+06 |
| S4 | −4.5424E+00 | 1.1740E+02 | −2.3696E+03 | 3.4258E+04 | −3.4897E+05 | 2.5371E+06 | −1.3339E+07 |
| S5 | 6.1811E+00 | −1.6720E+02 | 2.6729E+03 | −2.9845E+04 | 2.3843E+05 | −1.3834E+06 | 5.8864E+06 |
| S6 | −9.8502E−01 | 8.2980E−01 | 1.1273E+01 | −7.8659E+01 | 2.8448E+02 | −6.6508E+02 | 1.0472E+03 |

TABLE 11

| surface number | A18 | A20 | A22 | A24 | A26 | A28 | A30 |
|---|---|---|---|---|---|---|---|
| S1 | −8.1856E−02 | 1.6417E−02 | −1.9367E−03 | 1.0159E−04 | 0.0000E+00 | 0.0000E+00 | 0.0000E+00 |
| S2 | 1.9891E+05 | −2.3961E+05 | 1.8665E+05 | −8.4767E+04 | 1.7033E+04 | 0.0000E+00 | 0.0000E+00 |
| S3 | 0.0000E+00 | 0.0000E+00 | 0.0000E+00 | 0.0000E+00 | 0.0000E+00 | 0.0000E+00 | 0.0000E+00 |
| S4 | 5.1058E+07 | −1.4205E+08 | 2.8366E+08 | −3.9538E+08 | 3.6451E+08 | −1.9932E+08 | 4.8837E+07 |
| S5 | −1.8435E+07 | 4.2325E+07 | −7.0240E+07 | 8.1859E+07 | −6.3448E+07 | 2.9322E+07 | −6.1032E+06 |
| S6 | −1.1039E+03 | 7.4715E+02 | −2.9366E+02 | 5.0970E+01 | 0.0000E+00 | 0.0000E+00 | 0.0000E+00 |

Figure 8A:
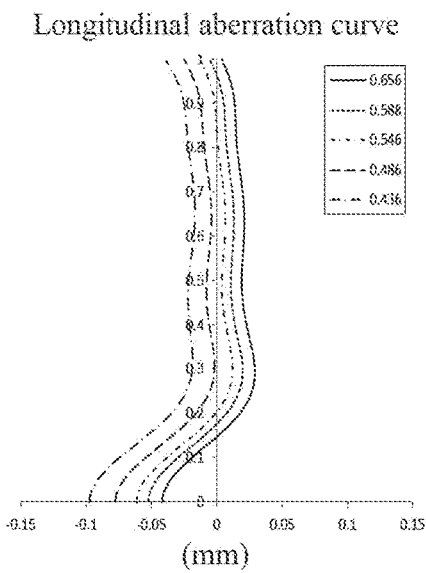
FIGS. 8A-8C respectively illustrate a longitudinal aberration curve, a distortion curve and a lateral color curve of the optical imaging lens assembly in Embodiment 4.
Figure 8B:
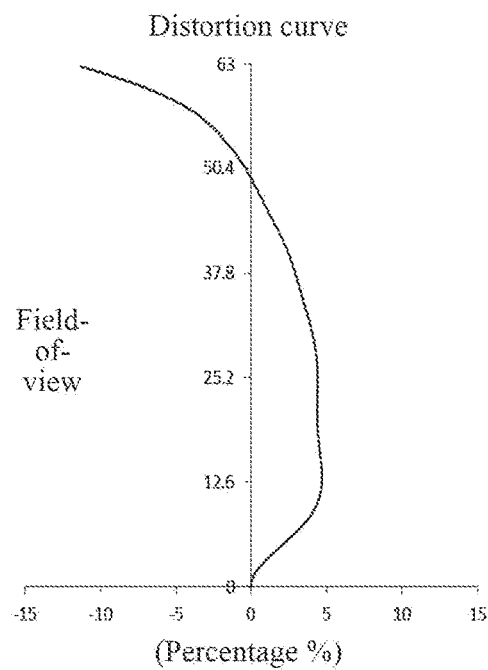
Figure 8C:
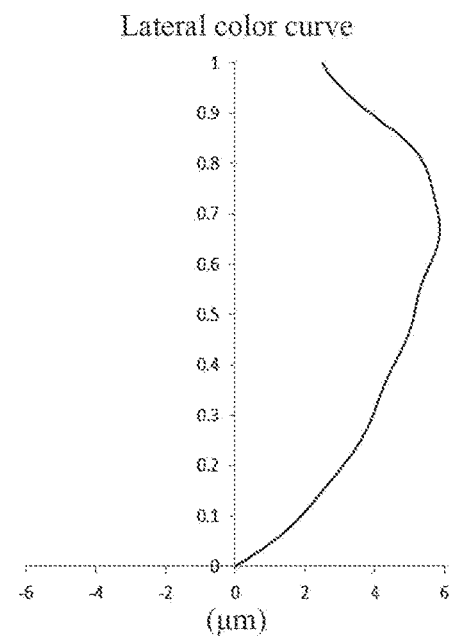

FIG. 8A illustrates a longitudinal aberration curve of the optical imaging lens assembly in Embodiment 4, representing deviations of focal points converged by light of different wavelengths which passes through the lens assembly. FIG. 8B illustrates a distortion curve of the optical imaging lens assembly in Embodiment 4, representing amounts of distortion corresponding to different fields-of-view. FIG. 8C illustrates a lateral color curve of the optical imaging lens assembly in Embodiment 4, representing deviations of different image heights on the image plane formed by light passing through the lens assembly. It can be seen from FIGS. 8A-8C that the optical imaging lens assembly given in Embodiment 4 can achieve a good imaging quality.

EMBODIMENT 5

Figure 9:
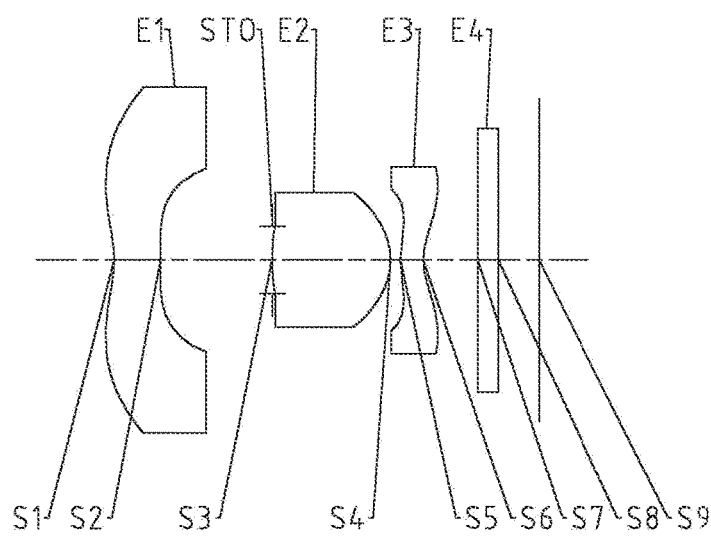
FIG. 9 is a schematic structural diagram of an optical imaging lens assembly according to Embodiment 5 of the present disclosure.

An optical imaging lens assembly according to Embodiment 5 of the present disclosure is described below with reference to FIGS. 9-10C. FIG. 9 is a schematic structural diagram of the optical imaging lens assembly according to Embodiment 5 of the present disclosure.

As shown in FIG. 9, the optical imaging lens assembly includes, sequentially along an optical axis from an object side to an image side, a first lens E1, a diaphragm STO, a second lens E2, a third lens E3 and an optical filter E4.

The first lens E1 has a negative refractive power, an object-side surface S1 of the first lens E1 is a concave surface, and an image-side surface S2 of the first lens E1 is a convex surface. The second lens E2 has a positive refractive power, an object-side surface S3 of the second lens E2 is a convex surface, and an image-side surface S4 of the second lens E2 is a convex surface. The third lens E3 has a negative refractive power, an object-side surface S5 of the third lens E3 is a convex surface, and an image-side surface S6 of the third lens E3 is a concave surface. The optical filter E4 has an object-side surface S7 and an image-side surface S8. The optical imaging lens assembly has an image plane S9, and light from an object sequentially passes through the surfaces S1-S8 and finally forms an image on the image plane S9.

Table 12 shows basic parameters of the optical imaging lens assembly in Embodiment 5. Here, the units of a radius of curvature and a thickness/distance are millimeters (mm). Tables 13 and 14 show the high-order coefficients $A_4$, $A_6$, $A_8$, $A_{10}$, $A_{12}$, $A_{14}$, $A_{16}$, $A_{18}$, $A_{20}$, $A_{22}$, $A_{24}$, $A_{26}$, $A_{28}$ and $A_{30}$ applicable to the aspheric surfaces S1-S6 in Embodiment 5. Here, the surface type of each aspheric surface may be defined using the formula (1) given in Embodiment 1.

TABLE 12

| surface number | surface type | radius of curvature | thickness/ distance | material refractive index | abbe number | conic coefficient |
|---|---|---|---|---|---|---|
| OBJ | spherical | infinite | 450.0000 | | | |
| S1 | aspheric | −1.1190 | 0.4705 | 1.55 | 56.1 | −7.7537 |
| S2 | aspheric | −6.8948 | 1.1345 | | | 52.5664 |
| STO | spherical | infinite | −0.0055 | | | |
| S3 | aspheric | 1.7139 | 1.2067 | 1.55 | 56.1 | 17.1954 |
| S4 | aspheric | −0.7481 | 0.1000 | | | −0.5170 |
| S5 | aspheric | 0.8160 | 0.2300 | 1.68 | 19.2 | −99.9000 |
| S6 | aspheric | 0.5577 | 0.5518 | | | −4.6752 |
| S7 | spherical | infinite | 0.2100 | 1.52 | 64.2 | |
| S8 | spherical | infinite | 0.4121 | | | |
| S9 | spherical | infinite | | | | |

TABLE 13

| surface number | A4 | A6 | A8 | A10 | A12 | A14 | A16 |
|---|---|---|---|---|---|---|---|
| S1 | 6.0476E−01 | −1.5223E+00 | 3.4578E+00 | −6.0807E+00 | 8.0042E+00 | −7.8693E+00 | 5.8005E+00 |
| S2 | 1.9192E−01 | 2.5370E+01 | −3.9541E+02 | 3.6064E+03 | −2.1916E+04 | 9.3434E+04 | −2.8702E+05 |
| S3 | −1.8438E+00 | −1.8378E+02 | 4.8582E+04 | −4.4728E+06 | 2.3274E+08 | −7.8213E+07 | 1.8020E+11 |
| S4 | −3.2406E+00 | 8.3990E+01 | −1.6329E+03 | 2.2787E+04 | −2.2460E+05 | 1.5809E+06 | −8.0447E+06 |
| S5 | 7.3708E+00 | −2.3566E+02 | 4.3405E+03 | −5.5488E+04 | 5.0844E+05 | −3.3998E+06 | 1.6768E+07 |
| S6 | −8.8095E−01 | 3.0196E+00 | −3.2587E+01 | 3.9303E+02 | −3.0010E+03 | 1.4870E+04 | −5.0399E+04 |

TABLE 14

| surface number | A18 | A20 | A22 | A24 | A26 | A28 | A30 |
|---|---|---|---|---|---|---|---|
| S1 | −3.2088E+00 | 1.3249E+00 | −4.0224E−01 | 8.7199E−02 | −1.2779E−02 | 1.1351E−03 | −4.6171E−05 |
| S2 | 6.4335E+05 | −1.0533E+06 | 1.2458E+06 | −1.0364E+06 | 5.7524E+05 | −1.9123E+05 | 2.8803E+04 |
| S3 | −2.9309E+12 | 3.4008E+13 | −2.8008E+14 | 1.6000E+15 | −6.0292E+15 | 1.3477E+06 | −1.3534E+16 |
| S4 | 2.9765E+07 | −7.9801E+07 | 1.5272E+08 | −2.0218E+08 | 1.7454E+08 | −8.7390E+07 | 1.8902E+07 |
| S5 | −6.1238E+07 | 1.6495E+08 | −3.2318E+08 | 4.4751E+08 | −4.1489E+08 | 2.3098E+08 | −5.8366E+07 |
| S6 | 1.2047E+05 | −2.0552E+05 | 2.4916E+05 | −2.0987E+05 | 1.1682E+05 | −3.8643E+04 | 5.7528E+03 |

Figure 10A:
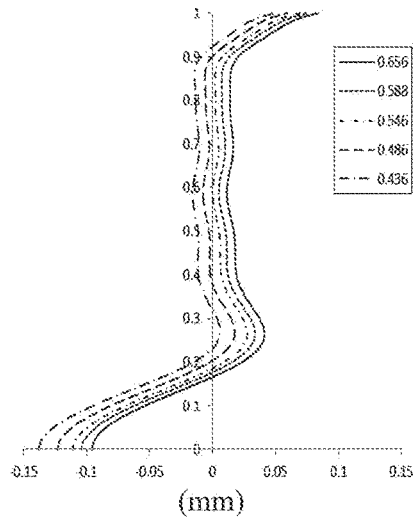
FIGS. 10A-10C respectively illustrate a longitudinal aberration curve, a distortion curve and a lateral color curve of the optical imaging lens assembly in Embodiment 5.
Figure 10B:
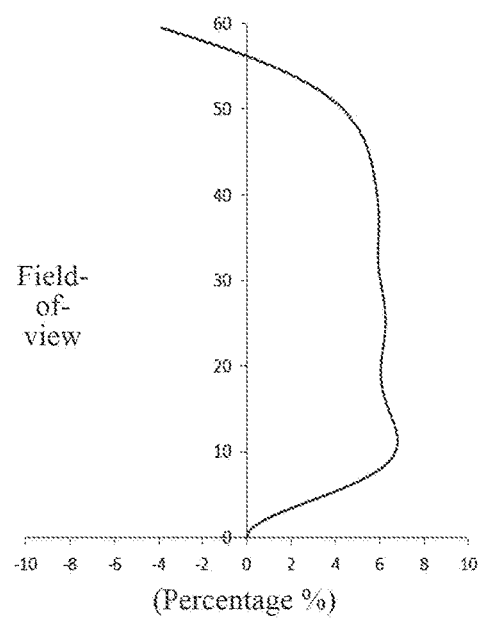
Figure 10C:
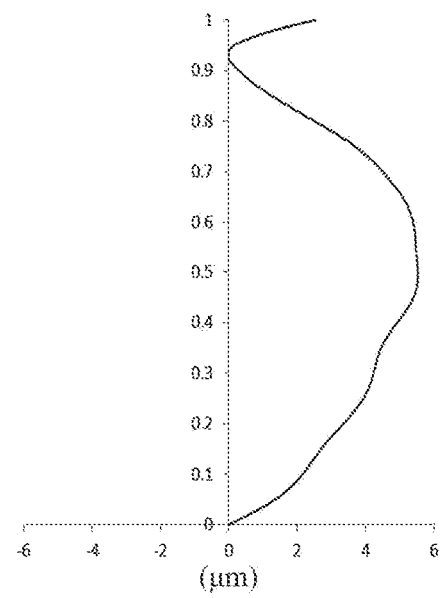

FIG. 10A illustrates a longitudinal aberration curve of the optical imaging lens assembly in Embodiment 5, representing deviations of focal points converged by light of different wavelengths which passes through the lens assembly. FIG. 10B illustrates a distortion curve of the optical imaging lens assembly in Embodiment 5, representing amounts of distortion corresponding to different fields-of-view. FIG. 10C illustrates a lateral color curve of the optical imaging lens assembly in Embodiment 5, representing deviations of different image heights on the image plane formed by light passing through the lens assembly. It can be seen from FIGS. 10A-10C that the optical imaging lens assembly given in Embodiment 5 can achieve a good imaging quality.

EMBODIMENT 6

Figure 11:
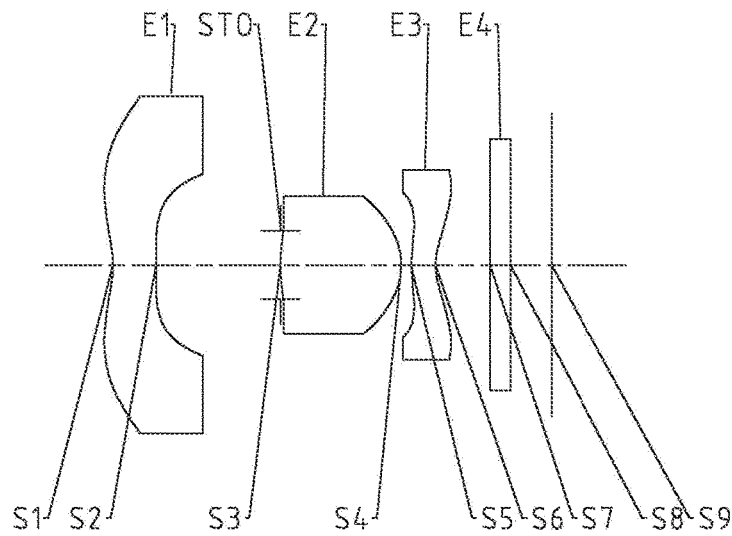
FIG. 11 is a schematic structural diagram of an optical imaging lens assembly according to Embodiment 6 of the present disclosure.

An optical imaging lens assembly according to Embodiment 6 of the present disclosure is described below with reference to FIGS. 11-12C. FIG. 11 is a schematic structural diagram of the optical imaging lens assembly according to Embodiment 6 of the present disclosure.

As shown in FIG. 11, the optical imaging lens assembly includes, sequentially along an optical axis from an object side to an image side, a first lens E1, a diaphragm STO, a second lens E2, a third lens E3 and an optical filter E4.

The first lens E1 has a negative refractive power, an object-side surface S1 of the first lens E1 is a concave surface, and an image-side surface S2 of the first lens E1 is a convex surface. The second lens E2 has a positive refractive power, an object-side surface S3 of the second lens E2 is a convex surface, and an image-side surface S4 of the second lens E2 is a convex surface. The third lens E3 has a negative refractive power, an object-side surface S5 of the third lens E3 is a convex surface, and an image-side surface S6 of the third lens E3 is a concave surface. The optical filter E4 has an object-side surface S7 and an image-side surface S8. The optical imaging lens assembly has an image plane S9, and light from an object sequentially passes through the surfaces S1-S8 and finally forms an image on the image plane S9.

Table 15 shows basic parameters of the optical imaging lens assembly in Embodiment 6. Here, the units of a radius of curvature and a thickness/distance are millimeters (mm). Tables 16 and 17 show the high-order coefficients $A_4$, $A_6$, $A_8$, $A_{10}$, $A_{12}$, $A_{14}$, $A_{16}$, $A_{18}$, $A_{20}$, $A_{22}$, $A_{24}$, $A_{26}$, $A_{28}$ and $A_{30}$ applicable to the aspheric surfaces S1-S6 in Embodiment 6. Here, the surface type of each aspheric surface may be defined using the formula (1) given in Embodiment 1.

TABLE 15

| surface number | surface type | radius of curvature | thickness/ distance | material refractive index | abbe number | conic coefficient |
|---|---|---|---|---|---|---|
| OBJ | spherical | infinite | 450.0000 | | | |
| S1 | aspheric | −1.1087 | 0.4434 | 1.55 | 56.1 | −7.1812 |
| S2 | aspheric | −7.1737 | 1.2836 | | | 55.9983 |
| STO | spherical | infinite | −0.0061 | | | |
| S3 | aspheric | 1.7741 | 1.2484 | 1.55 | 56.1 | 17.9858 |
| S4 | aspheric | −0.7808 | 0.1000 | | | −0.5128 |
| S5 | aspheric | 0.8652 | 0.2500 | 1.68 | 19.2 | −99.9000 |
| S6 | aspheric | 0.5873 | 0.5621 | | | −4.7717 |
| S7 | spherical | infinite | 0.2100 | 1.52 | 64.2 | |
| S8 | spherical | infinite | 0.4224 | | | |
| S9 | spherical | infinite | | | | |

TABLE 16

| surface number | A4 | A6 | A8 | A10 | A12 | A14 | A16 |
|---|---|---|---|---|---|---|---|
| S1 | 6.4164E−01 | −1.8040E+00 | 4.8271E+00 | −1.0279E+01 | 1.6523E+01 | −1.9735E+01 | 1.7440E+01 |
| S2 | −2.9166E−01 | 3.8987E+01 | −6.2571E+02 | 6.0365E+03 | −3.8871E+04 | 1.7490E+05 | −5.6379E+05 |
| S3 | −1.3318E+00 | −4.7921E+01 | 1.6242E+04 | −1.4900E+06 | 7.5280E+07 | −2.4437E+09 | 5.4312E+10 |
| S4 | −3.6214E+00 | 8.7192E+01 | −1.5044E+03 | 1.8545E+04 | −1.6183E+05 | 1.0089E+06 | −4.5345E+06 |
| S5 | 5.4193E+00 | −1.6948E+02 | 3.0083E+03 | −3.7030E+04 | 3.2711E+05 | −2.1066E+06 | 9.9737E+06 |
| S6 | −1.0053E+00 | 2.5715E+00 | 1.2280E+01 | −1.6703E+02 | 8.2419E+02 | −2.1989E+03 | 2.6942E+03 |

TABLE 17

| surface number | A18 | A20 | A22 | A24 | A26 | A28 | A30 |
|---|---|---|---|---|---|---|---|
| S1 | −1.1366E+01 | 5.4246E+00 | −1.8672E+00 | 4.5028E−01 | −7.2085E−02 | 6.8740E−03 | −2.9531E−04 |
| S2 | 1.3176E+06 | −2.2354E+06 | 2.7238E+06 | −2.3218E+06 | 1.3139E+06 | −4.4330E+05 | 6.7477E+04 |
| S3 | −8.5122E+11 | 9.5039E+12 | −7.5169E+13 | 4.1144E+14 | −1.4817E+15 | 3.1572E+15 | −3.0146E+15 |
| S4 | 1.4719E+07 | −3.4219E+07 | 5.5720E+07 | −6.0779E+07 | 4.0718E+07 | −1.3817E+07 | 1.2399E+06 |
| S5 | −3.4807E+07 | 8.9146E+07 | −1.6523E+08 | 2.1542E+08 | −1.8722E+08 | 9.7322E+07 | −2.2882E+07 |
| S6 | 1.9717E+03 | −1.3982E+04 | 2.6423E+04 | −2.8049E+04 | 1.7897E+04 | −6.4353E+03 | 1.0068E+03 |

Figure 12A:
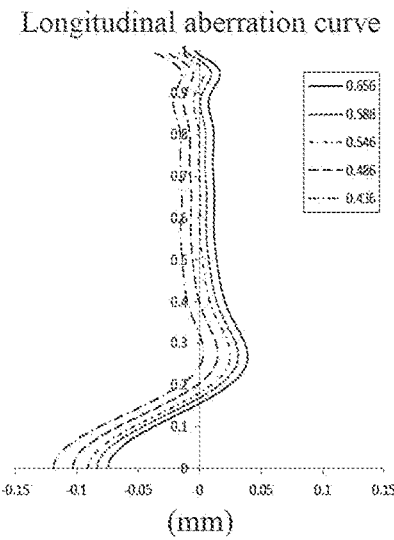
FIGS. 12A-12C respectively illustrate a longitudinal aberration curve, a distortion curve and a lateral color curve of the optical imaging lens assembly in Embodiment 6.
Figure 12B:
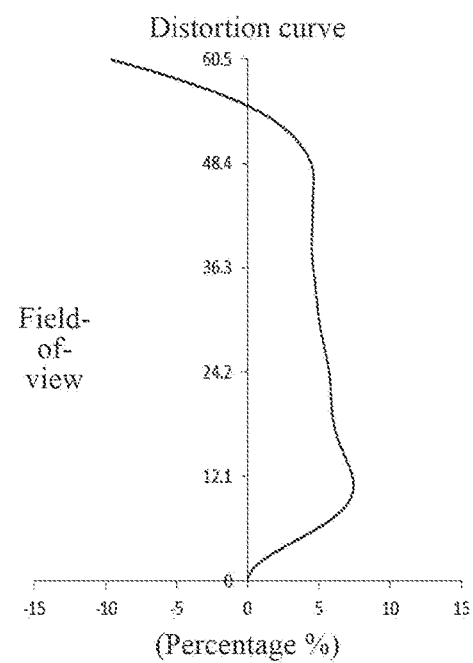
Figure 12C:
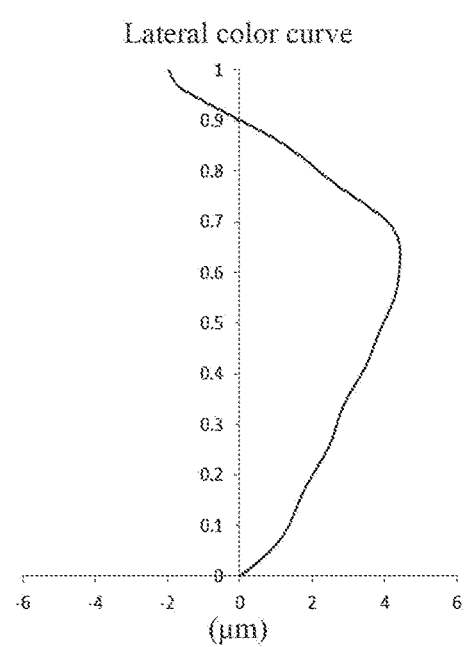

FIG. 12A illustrates a longitudinal aberration curve of the optical imaging lens assembly in Embodiment 6, representing deviations of focal points converged by light of different wavelengths which passes through the lens assembly. FIG. 12B illustrates a distortion curve of the optical imaging lens assembly in Embodiment 6, representing amounts of distortion corresponding to different fields-of-view. FIG. 12C illustrates a lateral color curve of the optical imaging lens assembly in Embodiment 6, representing deviations of different image heights on the image plane formed by light passing through the lens assembly. It can be seen from FIGS. 12A-12C that the optical imaging lens assembly given in Embodiment 6 can achieve a good imaging quality.

EMBODIMENT 7

An optical imaging lens assembly according to Embodiment 7 of the present disclosure is described below with reference to FIGS. 13-14C. FIG. 13 is a schematic structural diagram of the optical imaging lens assembly according to Embodiment 7 of the present disclosure.

As shown in FIG. 13, the optical imaging lens assembly includes, sequentially along an optical axis from an object side to an image side, a first lens E1, a diaphragm STO, a second lens E2, a third lens E3 and an optical filter E4.

The first lens E1 has a negative refractive power, an object-side surface S1 of the first lens E1 is a concave surface, and an image-side surface S2 of the first lens E1 is a convex surface. The second lens E2 has a positive refractive power, an object-side surface S3 of the second lens E2 is a convex surface, and an image-side surface S4 of the second lens E2 is a convex surface. The third lens E3 has a negative refractive power, an object-side surface S5 of the third lens E3 is a convex surface, and an image-side surface S6 of the third lens E3 is a concave surface. The optical filter E4 has an object-side surface S7 and an image-side surface S8. The optical imaging lens assembly has an image plane S9, and light from an object sequentially passes through the surfaces S1-S8 and finally forms an image on the image plane S9.

Table 18 shows basic parameters of the optical imaging lens assembly in Embodiment 7. Here, the units of a radius of curvature and a thickness/distance are millimeters (mm). Tables 19 and 20 show the high-order coefficients $A_4$, $A_6$, $A_8$, $A_{10}$, $A_{12}$, $A_{14}$, $A_{16}$, $A_{18}$, $A_{20}$, $A_{22}$, $A_{24}$, $A_{26}$, $A_{28}$ and $A_{30}$ applicable to the aspheric surfaces S1-S6 in Embodiment 7. Here, the surface type of each aspheric surface may be defined using the formula (1) given in Embodiment 1.

TABLE 18

| surface number | surface type | radius of curvature | thickness/ distance | material refractive index | abbe number | conic coefficient |
|---|---|---|---|---|---|---|
| OBJ | spherical | infinite | infinite | | | |
| S1 | aspheric | −0.7490 | 0.3929 | 1.55 | 56.1 | −7.3320 |
| S2 | aspheric | −1.7815 | 0.9849 | | | −16.5680 |
| STO | spherical | infinite | 0.0082 | | | |
| S3 | aspheric | 2.7130 | 1.1236 | 1.55 | 56.1 | 23.7081 |
| S4 | aspheric | −0.7613 | 0.1000 | | | −0.2208 |
| S5 | aspheric | 0.8768 | 0.2600 | 1.65 | 23.5 | −99.9000 |
| S6 | aspheric | 0.7147 | 0.5331 | | | −4.2991 |
| S7 | spherical | infinite | 0.2100 | 1.52 | 64.2 | |
| S8 | spherical | infinite | 0.3933 | | | |
| S9 | spherical | infinite | | | | |

TABLE 19

| surface number | A4 | A6 | A8 | A10 | A12 | A14 | A16 |
|---|---|---|---|---|---|---|---|
| S1 | 7.6736E−01 | −1.8900E+00 | 3.9189E+00 | −5.9783E+00 | 6.4651E+00 | −4.8858E+00 | 2.5491E+00 |
| S2 | 1.7361E+00 | −3.7916E+00 | 5.8940E+00 | −3.1726E+01 | 3.3747E+02 | −1.7474E+03 | 5.0102E+03 |
| S3 | 1.8138E+00 | −1.8983E+02 | −7.9166E+03 | 2.6567E+06 | −2.3461E+08 | 1.1943E+10 | −4.0274E+11 |
| S4 | −2.5174E+00 | 7.0253E+01 | −1.4077E+03 | 1.8797E+04 | −1.6875E+05 | 1.0310E+06 | −4.2469E+06 |
| S5 | 7.1905E+00 | −1.6522E+02 | 2.5008E+03 | −2.7582E+04 | 2.2107E+05 | −1.2951E+06 | 5.5810E+06 |
| S6 | 4.6388E−01 | −5.3861E+00 | −1.2220E+01 | 3.7661E+02 | −2.6843E+03 | 1.1168E+04 | −3.1040E+04 |

TABLE 20

| surface number | A18 | A20 | A22 | A24 | A26 | A28 | A30 |
|---|---|---|---|---|---|---|---|
| S1 | −8.9697E−01 | 2.0287E−01 | −2.6603E−02 | 1.5362E−03 | 0.0000E+00 | 0.0000E+00 | 0.0000E+00 |
| S2 | −8.5609E+03 | 8.7037E+03 | −4.8620E+03 | 1.1479E+03 | 0.0000E+00 | 0.0000E+00 | 0.0000E+00 |
| S3 | 9.4721E+12 | −1.5827E+14 | 1.8753E+15 | −1.5413E+16 | 8.3590E+16 | −2.6895E+17 | 3.8868E+17 |
| S4 | 1.1148E+07 | −1.4715E+07 | −8.3825E+06 | 7.3549E+07 | −1.3572E+08 | 1.1905E+07 | −4.2634E+07 |
| S5 | −1.7727E+07 | 4.1305E+07 | −6.9600E+07 | 8.2410E+07 | −6.4961E+07 | 3.0581E+07 | −6.5002E+06 |
| S6 | 6.0325E+04 | −8.3250E+04 | 8.1320E+04 | −5.5006E+04 | 2.4520E+04 | −6.4818E+03 | 7.7001E+02 |

FIG. 14A illustrates a longitudinal aberration curve of the optical imaging lens assembly in Embodiment 7, representing deviations of focal points converged by light of different wavelengths which passes through the lens assembly. FIG. 14B illustrates a distortion curve of the optical imaging lens assembly in Embodiment 7, representing amounts of distortion corresponding to different fields-of-view. FIG. 14C illustrates a lateral color curve of the optical imaging lens assembly in Embodiment 7, representing deviations of different image heights on the image plane formed by light passing through the lens assembly. It can be seen from FIGS. 14A-14C that the optical imaging lens assembly given in Embodiment 7 can achieve a good imaging quality.

In addition, in Embodiments 1-7, the distance TTL from the object-side surface of the first lens to the image plane of the optical imaging lens assembly along the optical axis, the half of the diagonal length ImgH of the effective pixel area on the image plane of the optical imaging lens assembly, the maximal field-of-view FOV of the optical imaging lens assembly, the effective focal length f of the optical imaging lens assembly, the focal length values f1-f3 of the lenses, and the absolute value of the maximal distortion |DISTmax| of the optical imaging lens assembly are as shown in Table 21.

TABLE 21

| parameter/ embodiment | 1 | 2 | 3 | 4 | 5 | 6 | 7 |
|---|---|---|---|---|---|---|---|
| TTL(mm) | 4.02 | 3.86 | 4.59 | 4.15 | 4.31 | 4.51 | 4.01 |
| ImgH(mm) | 1.60 | 1.55 | 1.54 | 1.60 | 1.60 | 1.55 | 1.55 |
| FOV(°) | 132.7 | 119.8 | 118.6 | 125.4 | 119.0 | 120.8 | 125.8 |
| f(mm) | 0.87 | 0.96 | 0.88 | 0.91 | 0.94 | 0.94 | 0.87 |
| f1(mm) | −2.72 | −2.97 | −2.26 | −2.41 | −2.52 | −2.46 | −2.73 |
| f2(mm) | 1.21 | 0.90 | 1.31 | 1.26 | 1.15 | 1.20 | 1.23 |

TABLE 21-continued

| parameter/embodiment | 1 | 2 | 3 | 4 | 5 | 6 | 7 |
|---|---|---|---|---|---|---|---|
| f3(mm) | −13.35 | −1.92 | −9.04 | −14.64 | −4.05 | −4.23 | −16.15 |
| \|DISTmax\|(%) | 22.60 | 9.60 | 10.40 | 11.32 | 6.25 | 9.60 | 11.68 |

Embodiments 1-7 respectively satisfy the conditions shown in Table 22.

TABLE 22

| conditional expression/embodiment | 1 | 2 | 3 | 4 | 5 | 6 | 7 |
|---|---|---|---|---|---|---|---|
| f1/f | −3.12 | −3.11 | −2.57 | −2.64 | −2.69 | −2.62 | −3.14 |
| f2/f | 1.38 | 0.94 | 1.49 | 1.38 | 1.23 | 1.28 | 1.41 |
| tan(FOV/2) × f (mm) | 1.99 | 1.65 | 1.48 | 1.77 | 1.59 | 1.65 | 1.70 |
| ImgH × f/EPD (mm) | 3.53 | 3.47 | 3.38 | 3.52 | 3.52 | 3.41 | 3.40 |
| TTL/ImgH | 2.51 | 2.49 | 2.99 | 2.59 | 2.69 | 2.91 | 2.59 |
| R1/f | −0.86 | −1.24 | −0.89 | −1.21 | −1.20 | −1.18 | −0.86 |
| R4/R6 | −1.01 | −0.80 | −1.55 | −1.36 | −1.34 | −1.33 | −1.07 |
| (CT1 + CT3)/CT2 | 0.56 | 0.72 | 0.56 | 0.69 | 0.58 | 0.56 | 0.58 |
| 10*T23/T12 | 1.00 | 1.11 | 0.66 | 1.01 | 0.89 | 0.78 | 1.01 |
| CT1/DT11 | 0.23 | 0.30 | 0.19 | 0.29 | 0.27 | 0.25 | 0.24 |
| DT22/DT31 | 0.87 | 0.87 | 0.98 | 0.91 | 0.95 | 0.95 | 0.87 |
| DT12/DT21 | 2.98 | 2.77 | 2.56 | 2.50 | 2.58 | 2.49 | 2.96 |
| SAG22/CT2 | −0.35 | −0.40 | −0.35 | −0.37 | −0.31 | −0.32 | −0.36 |
| CT3/YT32 | 1.71 | 1.61 | 2.27 | 1.58 | 1.53 | 1.55 | 1.63 |
| CT1/ET1 | 0.78 | 1.13 | 0.49 | 0.88 | 0.74 | 0.69 | 0.81 |
| CT3/ET3 | 0.62 | 0.52 | 0.54 | 0.56 | 0.51 | 0.53 | 0.60 |

The present disclosure further provides an imaging apparatus provided with an electronic photosensitive element for forming an image, and the electronic photosensitive element may be a charge coupled device (CCD) or complementary metal-oxide semiconductor element (CMOS). The imaging apparatus may be an independent imaging device such as a digital camera, or may be an imaging module integrated in a mobile electronic device such as a mobile phone. The imaging apparatus is equipped with the optical imaging lens assembly described above.

The foregoing is only a description for the preferred embodiments of the present disclosure and the applied technical principles. It should be appreciated by those skilled in the art that the scope of protection of the present disclosure is not limited to the technical solution formed by the particular combinations of the above technical features. The scope of protection should also cover other technical solutions formed by any combination of the above technical features or equivalent features thereof without departing from the concept of the present disclosure, such as, technical solutions formed by replacing the features as disclosed in the present disclosure with (but not limited to) technical features with similar functions.

What is claimed is:

1. An optical imaging lens assembly, comprising, sequentially along an optical axis from an object side to an image side:
    a first lens, having a negative refractive power, an object-side surface of the first lens being a concave surface;
    a second lens, having a positive refractive power, an image-side surface of the second lens being a convex surface; and
    a third lens, having a negative refractive power, an object-side surface of the third lens being a convex surface and an image-side surface of the third lens being a concave surface,
    wherein at least one of the object-side surface and the image-side surface of the third lens has at least one inflection point, in the optical imaging lens assembly
    wherein the number of lenses in the optical imaging lens assembly having refractive powers is three, and the optical imaging lens assembly satisfies:
    $0.94 \leq f2/f < 1.5$;
    $-1.5 < R1/f < -0.5$;
    $1 < CT3/YT32 < 2.5$; and
    $1 \text{ mm} < \tan(FOV/2) \times f < 2 \text{ mm}$,
    wherein f2 is an effective focal length of the second lens, f is an effective focal length of the optical imaging lens assembly, R1 is a radius of curvature of the object-side surface of the first lens, CT3 is a center thickness of the third lens on the optical axis, YT32 is an axial distance from an intersection point of the image-side surface of the third lens and the optical axis to a point on the image-side surface of the third lens, the point being closest to the image plane of the optical imaging lens assembly, and FOV is a maximal field-of-view of the optical imaging lens assembly.

2. The optical imaging lens assembly according to claim 1, wherein a half of a diagonal length ImgH of an effective pixel area on an image plane of the optical imaging lens assembly, the effective focal length f of the optical imaging lens assembly and an entrance pupil diameter EPD of the optical imaging lens assembly satisfy:
    $3 \text{ mm} < \text{ImgH} \times f/EPD < 4 \text{ mm}$.

3. The optical imaging lens assembly according to claim 1, wherein a maximal effective radius DT22 of the image-side surface of the second lens and a maximal effective radius DT31 of the object-side surface of the third lens satisfy:
    $0.5 < DT22/DT31 < 1$.

4. The optical imaging lens assembly according to claim 1, wherein an axial distance SAG22 from an intersection point of the image-side surface of the second lens and the optical axis to a vertex of an effective radius of the image-side surface of the second lens, and a center thickness CT2 of the second lens on the optical axis satisfy:

−0.5<SAG22/CT2<0.

5. The optical imaging lens assembly according to claim 1, wherein the optical imaging lens assembly satisfies: −4<f1/f≥−2.62, wherein f1 is an effective focal length of the first lens.

6. The optical imaging lens assembly according to claim 1, wherein a distance TTL from the object-side surface of the first lens to an image plane of the optical imaging lens assembly along the optical axis and a half of a diagonal length ImgH of the effective pixel area on the image plane of the optical imaging lens assembly satisfy:

2<TTL/ImgH≤3.

7. The optical imaging lens assembly according to claim 1, wherein a radius of curvature R4 of the image-side surface of the second lens and a radius of curvature R6 of the image-side surface of the third lens satisfy:

−2<R4/R6<−0.5.

8. The optical imaging lens assembly according to claim 1, wherein a center thickness CT1 of the first lens on the optical axis, the center thickness CT3 of the third lens on the optical axis and a center thickness CT2 of the second lens on the optical axis satisfy:

0<(CT1+CT3)/CT2<1.

9. The optical imaging lens assembly according to claim 1, wherein a spaced interval T23 between the second lens and the third lens on the optical axis and a spaced interval T12 between the first lens and the second lens on the optical axis satisfy:

0<10×T23/T12<2.

10. The optical imaging lens assembly according to claim 1, wherein a center thickness CT1 of the first lens on the optical axis and a maximal effective radius DT11 of the object-side surface of the first lens satisfy:

0<CT1/DT11<0.5.

11. The optical imaging lens assembly according to claim 1, wherein a maximal effective radius DT12 of an image-side surface of the first lens and a maximal effective radius DT21 of an object-side surface of the second lens satisfy:

2<DT12/DT21<3.

12. The optical imaging lens assembly according to claim 1, wherein a center thickness CT1 of the first lens on the optical axis and an edge thickness ET1 of the first lens at a maximal effective radius satisfy:

0.4<CT1/ET1<1.3.

13. The optical imaging lens assembly according to claim 1, wherein the center thickness CT3 of the third lens on the optical axis and an edge thickness ET3 of the third lens at a maximal effective radius satisfy:

0.5<CT3/ET3<1.

\* \* \* \* \*